(12) United States Patent
Lu et al.

(10) Patent No.: US 10,349,390 B2
(45) Date of Patent: Jul. 9, 2019

(54) COMMUNICATION METHOD, COMMUNICATIONS APPARATUS, USER EQUIPMENT, AND COMMUNICATIONS SYSTEM

(71) Applicant: HUAWEI TECHNOLOGIES CO., LTD., Shenzhen (CN)

(72) Inventors: Weishan Lu, Shenzhen (CN); Tao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 15/394,301

(22) Filed: Dec. 29, 2016

(65) Prior Publication Data

US 2017/0111893 A1   Apr. 20, 2017

Related U.S. Application Data

(63) Continuation of application No. PCT/CN2014/081410, filed on Jul. 1, 2014.

(51) Int. Cl.
*H04W 72/04* (2009.01)
*H04L 1/16* (2006.01)
(Continued)

(52) U.S. Cl.
CPC .......... *H04W 72/042* (2013.01); *H04L 1/16* (2013.01); *H04L 1/1854* (2013.01);
(Continued)

(58) Field of Classification Search
CPC ........ H04W 72/042; H04W 72/0453; H04W 72/0446; H04W 72/044; H04W 84/12;
(Continued)

(56) References Cited

U.S. PATENT DOCUMENTS

| 2009/0028263 | A1 | 1/2009 | Yu et al. | |
| 2010/0039926 | A1* | 2/2010 | Zhang | H04L 1/1692 370/208 |

(Continued)

FOREIGN PATENT DOCUMENTS

| CN | 1838583 A | 9/2006 |
| CN | 101043241 A | 9/2007 |

(Continued)

OTHER PUBLICATIONS

IEEE Standard for Information technology; Telecommunications and information exchange between systems, Local and metropolitan area networks—Specific requirements; "Part 11: Wireless LAN Medium Access Control (MAC) and Physical Layer (PHY) Specifications; Amendment 4: Enhancements for Very High Throughput for Operation in Bands below 6 GHz"; IEEE Computer Society; IEEE Std 802.11ac—2013, 425 pages.

(Continued)

*Primary Examiner* — Phuc H Tran
(74) *Attorney, Agent, or Firm* — Fish & Richardson P.C.

(57) ABSTRACT

Embodiments of the present invention disclose a communication method: sending indication information to two or more user equipments, where the indication information includes timeslot indication information and frequency band indication information of the two or more user equipments, at least two user equipments in the two or more user equipments have same timeslot indication information, and the user equipments that have the same timeslot indication information have different frequency band indication information; and obtaining an acknowledgment frame sent by one or more user equipments of the two or more user equipments in a timeslot indicated by respective timeslot indication information and by using a frequency band indicated by respective frequency band indication information. The present invention is used for acknowledgment frame sending.

16 Claims, 9 Drawing Sheets

(51) Int. Cl.
  *H04L 1/18* (2006.01)
  *H04L 5/00* (2006.01)
  *H04W 84/12* (2009.01)

(52) U.S. Cl.
  CPC .......... *H04L 1/1861* (2013.01); *H04L 1/1864* (2013.01); *H04L 5/0055* (2013.01); *H04W 72/0446* (2013.01); *H04W 72/0453* (2013.01); *H04W 72/044* (2013.01); *H04W 84/12* (2013.01)

(58) Field of Classification Search
  CPC ... H04L 5/0055; H04L 1/1864; H04L 1/1861; H04L 1/1854; H04L 1/16
  See application file for complete search history.

(56) References Cited

U.S. PATENT DOCUMENTS

| | | | | |
|---|---|---|---|---|
| 2010/0202347 | A1* | 8/2010 | Sridhara | H04L 1/1607 370/328 |
| 2013/0215823 | A1* | 8/2013 | Shin | H04L 5/001 370/328 |

FOREIGN PATENT DOCUMENTS

| | | |
|---|---|---|
| CN | 101198092 A | 6/2008 |
| CN | 101651525 A | 2/2010 |
| CN | 102111252 A | 6/2011 |
| CN | 102318252 A | 1/2012 |
| JP | 2010045786 A | 2/2010 |
| WO | 8906407 A1 | 7/1989 |

OTHER PUBLICATIONS

IEEE Standard for Information technology; Telecommunications and information exchange between systems, Local and metropolitan area networks—Specific requirements; "Part 11: Wireless LAN Medium Access Control (MAC) and Physical Layer (PHY) Specifications; Amendment 5: Enhancements for Higher Throughput"; IEEE Computer Society; IEEE Std 802.11n—2009; 536 pages.
International Search Report issued in International Application No. PCT/CN2014/081410, dated Mar. 27, 2015, 4 pages.
Chinese Office Action issued in Chinese Application No. 201480079807.7 dated Dec. 29, 2018, 7 pages.

* cited by examiner

COMMUNICATION METHOD, COMMUNICATIONS APPARATUS, USER EQUIPMENT, AND COMMUNICATIONS SYSTEM

CROSS-REFERENCE TO RELATED APPLICATIONS

This application is a continuation of International Application No. PCT/CN2014/081410, filed on Jul. 1, 2014, the disclosure of which is hereby incorporated by reference in its entirety.

TECHNICAL FIELD

The present invention relates to the communications field, and in particular, to a communication method, a communications apparatus, user equipment, and a communications system.

BACKGROUND

A multiple-input multiple-output (Multiple-Input Multiple-Output, MIMO) technology is one of key technologies in the 802.11n standard protocol. In one aspect, the technology can provide transmit (receive) beamforming, thereby effectively improving transmit (receive) power, and effectively improving reliability of a communications system; in another aspect, the technology can generate an additional spatial degree of freedom, thereby exponentially increasing a system throughput, and effectively improving a rate of the communications system.

In an application process of the MIMO technology, when link antenna quantities are asymmetrical, that is, a quantity of antennas at a transmit end is not equal to a quantity of antennas at a receive end, a maximum quantity of transmitted data flows that can be supported by the MIMO technology is limited to the smallest value that is not greater than the quantity of transmit antennas or the quantity of receive antennas. Therefore, asymmetrical antenna quantities cause a degree of freedom of the MIMO technology not to be effectively utilized, and limits an increase in the system throughput. For example, in a wireless local area network, considering costs and a size, only one antenna is generally mounted on a terminal. However, an access device (Access Point, AP for short) manufacturer mounts several antennas on most current AP products. When the AP performs data communication with the terminal, if only one antenna is mounted on the terminal, a maximum of one data flow can be transmitted regardless of a quantity of antennas at the AP end.

To further increase the system throughput and the MIMO degree of freedom, after 802.11n, the Institute of Electrical and Electronics Engineers (Institute of Electrical and Electronics Engineers, IEEE for short) Union is drafting and revising the 802.11 ac standard. The standard is exclusively for a 5 GHz frequency band, a supported system bandwidth is increased from 40 Mbit/s in 802.11n to 80 Mbit/s, and even to 160 Mbit/s. The standard supports a higher-order 256 QAM modulation mode, and supports simultaneous transmission of a maximum of eight flows.

Considering a limitation of asymmetrical link antenna quantities to the MIMO technology, a multi-user multiple-input multiple-output (Multi-user Multiple-Input Multiple-Output, MU-MIMO for short) technology is introduced in the 802.11ac standard. By using the MU-MIMO technology, a transmit end can simultaneously communicate with multiple receive ends, and a quantity of data flows that can be simultaneously transmitted by the transmit end is not greater than the smallest value of a quantity of antennas at the transmit end and a sum of quantities of antennas at the receive ends. Therefore, when there are enough receive ends, even if there are few antennas at each receive end, the degree of freedom of the MIMO technology can still be fully utilized, thereby effectively improving the system throughput.

In a wireless local area network (Wireless Local Area Network, WLAN for short), referring to FIG. 1, in a process of communication between an AP and three stations (Station, STA for short), the AP sends data packets by sending very high throughput physical layer protocol data units (Very High Throughput Physical Layer Protocol Data Unit, VHT PPDU for short) to the three STAs by using the MU-MIMO technology according to the 802.11 ac standard. When receiving the VHT PPDUs, a STA1, a STA2, and a STA 3 respectively obtain the data packets of the STA1, the STA2, and the STA 3 by means of decoding, and sequentially wait one short interframe space (Short Interframe Space, SIFS for short) to return acknowledgment frames (Acknowledgement, ACK for short) to the AP, to indicate that the STAs have correctly received the data packets sent by a transmit end. It can be learned from FIG. 1 that a total time for returning the ACKs by the STA1, the STA2, and the STA 3 is $3\times(T_{ACK}+SIFS)$, where $T_{ACK}$ indicates ACK sending duration.

In the foregoing communication process, the inventor finds that the prior art has at least the following defects: When a transmit end communicates with multiple receive ends, a system requires a relatively long time to return ACKs, which occupies a large amount of channel time, and results in a waste of channel resources; in addition, because returning the ACKs takes too much time, channel reliability is affected, and consequently reliability of precoding performed by the transmit end is affected, and a packet error rate is increased.

SUMMARY

Embodiments of the present invention provide a communication method, a communications apparatus, user equipment, and a communications system, to save channel resources and reduce a packet error rate.

To achieve the foregoing objectives, the following technical solutions are used in the embodiments of the present invention:

According to a first aspect, a communication method is provided, where the method includes:

sending indication information to two or more user equipments, where the indication information includes timeslot indication information and frequency band indication information of the two or more user equipments, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information; and obtaining an acknowledgment frame sent by one or more user equipments of the two or more user equipments in a timeslot indicated by respective timeslot indication information and by using a frequency band indicated by respective frequency band indication information, where the acknowledgment frame sent by the one or more user equipments of the two or more user equipments is used to indicate that the one or more user equipments have correctly received a data packet.

With reference to the first aspect, in a first possible implementation manner of the first aspect, the sending indication information to two or more user equipments includes:

sending the indication information to the two or more user equipments by using control signaling; or sending the indication information to the two or more user equipments by using a data frame; or sending the indication information to the two or more user equipments by using a beacon frame.

With reference to the first aspect or the first possible implementation manner of the first aspect, in a second possible implementation manner of the first aspect, the obtaining an acknowledgment frame sent by one or more user equipments of the two or more user equipments in a timeslot indicated by respective timeslot indication information and by using a frequency band indicated by respective frequency band indication information includes:

receiving, by using M frequency bands, a first acknowledgment frame set sent by the one or more user equipments of the two or more user equipments in a first timeslot by using different frequency bands, where the first timeslot is any one of timeslots indicated by the timeslot indication information of user equipments in the two or more user equipments, the first acknowledgment frame set includes acknowledgment frames sent by the one or more user equipments in the first timeslot by using the different frequency bands, the two or more user equipments include K user equipments, and M and K are greater than or equal to 2; and respectively filtering the first acknowledgment frame set by using at least X filtering paths of N filtering paths, and respectively obtaining, from the first acknowledgment frame set, the first acknowledgment frame to the $X^{th}$ acknowledgment frame sent by using the different frequency bands, where N is greater than or equal to 2 and is less than or equal to a quantity of antennas, X is a quantity of acknowledgment frames included in the first acknowledgment frame set, X is less than or equal to N, and operating frequency bands of the X filtering paths are in one-to-one correspondence with and the same as the frequency bands used for sending the acknowledgment frames in the first acknowledgment frame set.

With reference to the second possible implementation manner of the first aspect, in a third possible implementation manner of the first aspect, when K is less than or equal to M and M is less than or equal to N, or when K is less than or equal to N and N is less than or equal to M, frequency band indication information of the K user equipments of the two or more user equipments respectively indicates any K different frequency bands of the M frequency bands, and timeslot indication information of the K user equipments of the two or more user equipments indicates a same timeslot.

With reference to the second possible implementation manner of the first aspect, in a fourth possible implementation manner of the first aspect, when K is greater than M and M is less than or equal to N, the K user equipments of the two or more user equipments are grouped into Q user equipment sets, where Q is K/M or Q is a rounded-up value of K/M or 1 plus a rounded-down value of K/M; and frequency band indication information of user equipments in each user equipment set of the Q user equipment sets indicates all or some of the M frequency bands from the first frequency band to the $M^{th}$ frequency band; timeslot indication information of the user equipments in each user equipment set of the Q user equipment sets indicates a same timeslot; and timeslot indication information of user equipments in any two user equipment sets of the Q user equipment sets indicates different timeslots.

With reference to the second possible implementation manner of the first aspect, in a fifth possible implementation manner of the first aspect, when K is greater than N and N is less than or equal to M, the K user equipments of the two or more user equipments are grouped into P user equipment sets, where P is K/N or P is a rounded-up value of K/N or 1 plus a rounded-down value of K/N; and frequency band indication information of user equipments in each user equipment set of the P user equipment sets indicates all or some of any N different frequency bands of the M frequency bands; timeslot indication information of the user equipments in each user equipment set indicates a same timeslot; and timeslot indication information of user equipments in any two user equipment sets of the P user equipment sets indicates different timeslots.

With reference to any one of the second possible implementation manner of the first aspect to the fifth possible implementation manner of the first aspect, in a sixth possible implementation manner of the first aspect, the indication information is at least $(\log_2 M + \log_2 J) \times K_{bits}$, $\log_2 M$ bits are frequency band indication information of one user equipment in the two or more user equipments, and $\log_2 J$ bits are timeslot indication information of one user equipment in the two or more user equipments; and when K is less than or equal to M and M is less than or equal to N, or when K is less than or equal to N and N is less than or equal to M, J is 2;

when K is greater than M and M is less than or equal to N, J is K/M or J is a rounded-up value of K/M or 1 plus a rounded-down value of K/M; or when K is greater than N and N is less than or equal to M, J is K/N or J is a rounded-up value of K/N or 1 plus a rounded-down value of K/N.

With reference to any one of the second possible implementation manner of the first aspect to the sixth possible implementation manner of the first aspect, in a seventh possible implementation manner of the first aspect, when M is less than or equal to 4 and K is less than or equal to 16, the indication information is at least 4×K bits.

With reference to any one of the first possible implementation manner of the first aspect to the seventh possible implementation manner of the first aspect, in an eighth possible implementation manner of the first aspect, when the indication information is sent to each user equipment in the two or more user equipments by using the data frame, the indication information is included in a very high throughput signal A VHT-SIG-A in the data frame.

With reference to the first aspect or any one of the first possible 3implementation manner of the first aspect to the eighth possible implementation manner of the first aspect, in a ninth possible implementation manner of the first aspect, the method is applied to a WLAN system.

According to a second aspect, a communication method is provided and is applied to user equipment, where the method includes:

receiving indication information, where the indication information includes timeslot indication information and frequency band indication information of the two or more user equipments, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information;

obtaining timeslot indication information and frequency band indication information of the user equipment from the indication information;

obtaining a data packet of the user equipment; and sending an acknowledgment frame according to the timeslot indication information and the frequency band indication information of the user equipment, in a timeslot indicated by the timeslot indication information of the user equipment, and by using a frequency band indicated by the frequency band indication information of the user equipment, where the acknowledgment frame is used to indicate that the user equipment has successfully received the data packet.

With reference to the second aspect, in a first possible implementation manner of the second aspect, the receiving indication information includes:

receiving the indication information by using control signaling or a data frame or a beacon frame.

According to a third aspect, a communications apparatus is provided, where the communications apparatus includes:

a sending unit, configured to send indication information to two or more user equipments, where the indication information includes timeslot indication information and frequency band indication information of the two or more user equipments, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information; and an obtaining unit, configured to obtain an acknowledgment frame sent by one or more user equipments of the two or more user equipments in a timeslot indicated by respective timeslot indication information and by using a frequency band indicated by respective frequency band indication information, where the acknowledgment frame sent by the one or more user equipments of the two or more user equipments is used to indicate that the one or more user equipments have correctly received a data packet.

With reference to the third aspect, in a first possible implementation manner of the third aspect, the sending unit is specifically configured to:

send the indication information to the two or more user equipments by using control signaling; or send the indication information to the two or more user equipments by using a data frame; or send the indication information to the two or more user equipments by using a beacon frame.

With reference to the third aspect or the first possible implementation manner of the third aspect, in a second possible implementation manner of the third aspect, the obtaining unit includes: at least two receiving modules and N filters, where each filter is connected to one receiving module, and N is greater than or equal to 2 and is less than or equal to a quantity of receiving modules;

the at least two receiving modules are configured to receive, by using M frequency bands, a first acknowledgment frame set sent by the one or more user equipments of the two or more user equipments in a first timeslot by using different frequency bands, where the first timeslot is any one of timeslots indicated by the timeslot indication information of user equipments in the two or more user equipments, the first acknowledgment frame set includes acknowledgment frames sent by the one or more user equipments in the first timeslot by using the different frequency bands, the two or more user equipments include K user equipments, and M and K are greater than or equal to 2; and the N filters are configured to: respectively filter the first acknowledgment frame set by using at least X filters of the N filters, and respectively obtain, from the first acknowledgment frame set, the first acknowledgment frame to the $X^{th}$ acknowledgment frame sent by using the different frequency bands, where N is greater than or equal to 2, X is a quantity of acknowledgment frames included in the first acknowledgment frame set, X is less than or equal to N, and operating frequency bands of the X filters are in one-to-one correspondence with and the same as the frequency bands used for sending the acknowledgment frames in the first acknowledgment frame set.

With reference to the second possible implementation manner of the third aspect, in a third possible implementation manner of the third aspect, when K is less than or equal to M and M is less than or equal to N, or when K is less than or equal to N and N is less than or equal to M, frequency band indication information of the K user equipments of the two or more user equipments respectively indicates any K different frequency bands of the M frequency bands, and timeslot indication information of the K user equipments of the two or more user equipments indicates a same timeslot.

With reference to the second possible implementation manner of the third aspect, in a fourth possible implementation manner of the third aspect, when K is greater than M and M is less than or equal to N, the K user equipments of the two or more user equipments are grouped into Q user equipment sets, where Q is K/M or Q is a rounded-up value of K/M or 1 plus a rounded-down value of K/M; and frequency band indication information of user equipments in each user equipment set of the Q user equipment sets indicates all or some of the M frequency bands from the first frequency band to the $M^{th}$ frequency band; timeslot indication information of the user equipments in each user equipment set of the Q user equipment sets indicates a same timeslot; and timeslot indication information of user equipments in any two user equipment sets of the Q user equipment sets indicates different timeslots.

With reference to the second possible implementation manner of the third aspect, in a fifth possible implementation manner of the third aspect, when K is greater than N and N is less than or equal to M, the K user equipments of the two or more user equipments are grouped into P user equipment sets, where P is K/N or P is a rounded-up value of K/N or 1 plus a rounded-down value of K/N; and frequency band indication information of user equipments in each user equipment set of the P user equipment sets indicates all or some of any N different frequency bands of the M frequency bands; timeslot indication information of the user equipments in each user equipment set indicates a same timeslot; and timeslot indication information of user equipments in any two user equipment sets of the P user equipment sets indicates different timeslots.

With reference to any one of the second possible implementation manner of the third aspect to the fifth possible implementation manner of the third aspect, in a sixth possible implementation manner of the third aspect, the indication information is $(\log_2 M + \log_2 J) \times K_{bits}$, $\log_2 M$ bits are frequency band indication information of one user equipment in the two or more user equipments, and $\log_2 J$ bits are timeslot indication information of one user equipment in the two or more user equipments; and when K is less than or equal to M and M is less than or equal to N, or when K is less than or equal to N and N is less than or equal to M, J is 2;

when K is greater than M and M is less than or equal to N, J is K/M or J is a rounded-up value of K/M or 1 plus a rounded-down value of K/M; or when K is greater than N and N is less than or equal to M, J is K/N or J is a rounded-up value of K/N or 1 plus a rounded-down value of K/N.

With reference to any one of the second possible implementation manner of the third aspect to the sixth possible implementation manner of the third aspect, in a seventh possible implementation manner of the third aspect, when M is less than or equal to 4 and K is less than or equal to 16, the indication information is at least 4×K bits.

With reference to any one of the first possible implementation manner of the third aspect to the seventh possible implementation manner of the third aspect, in an eighth possible implementation manner of the third aspect, when the sending unit sends the indication information to each user equipment in the two or more user equipments by using the data frame, the indication information is included in a very high throughput signal A VHT-SIG-A in the data frame.

With reference to any one of the third aspect or the first possible implementation manner of the third aspect to the eighth possible implementation manner of the third aspect, in a ninth possible implementation manner of the third aspect, the communications apparatus is a device that provides a WLAN access function.

According to a fourth aspect, user equipment is provided, where the user equipment includes:

a receiving unit, configured to receive indication information, where the indication information includes timeslot indication information and frequency band indication information of the two or more user equipments, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information;

an obtaining unit, configured to obtain timeslot indication information and frequency band indication information of the user equipment from the indication information; where the obtaining unit is further configured to obtain a data packet of the user equipment; and a sending unit, configured to send an acknowledgment frame according to the timeslot indication information and the frequency band indication information of the user equipment, in a timeslot indicated by the timeslot indication information of the user equipment, and by using a frequency band indicated by the frequency band indication information of the user equipment, where the acknowledgment frame is used to indicate that the user equipment has successfully received the data packet.

With reference to the fourth aspect, in a first possible implementation manner of the fourth aspect, the receiving unit is specifically configured to:

receive the indication information by using control signaling or a data frame or a beacon frame.

According to a fifth aspect, a communications apparatus is provided, where the communications apparatus includes:

a baseband processing unit, configured to send indication information to two or more user equipments, where the indication information includes timeslot indication information and frequency band indication information of the two or more user equipments, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information; where the baseband processing unit is further configured to obtain an acknowledgment frame sent by one or more user equipments of the two or more user equipments in a timeslot indicated by respective timeslot indication information and by using a frequency band indicated by respective frequency band indication information, where the acknowledgment frame sent by the one or more user equipments of the two or more user equipments is used to indicate that the one or more user equipments have correctly received a data packet.

With reference to the fifth aspect, in a first possible implementation manner of the fifth aspect, the baseband processing unit is specifically configured to:

send the indication information to the two or more user equipments by using control signaling; or send the indication information to the two or more user equipments by using a data frame; or send the indication information to the two or more user equipments by using a beacon frame.

With reference to any one of the fifth aspect or the first possible implementation manner of the fifth aspect, in a second possible implementation manner of the fifth aspect, the communications apparatus further includes: at least two antennas and N filters, where each filter is connected to one antenna, and N is greater than or equal to 2 and is less than or equal to a quantity of antennas;

the at least two antennas are configured to receive, by using M frequency bands, a first acknowledgment frame set sent by the one or more user equipments of the two or more user equipments in a first timeslot by using different frequency bands, where the first timeslot is any one of timeslots indicated by the timeslot indication information of user equipments in the two or more user equipments, the first acknowledgment frame set includes acknowledgment frames sent by the one or more user equipments in the first timeslot by using the different frequency bands, the two or more user equipments include K user equipments, and M and K are greater than or equal to 2;

the N filters are configured to: respectively filter the first acknowledgment frame set by using at least X filters of the N filters, and respectively obtain, from the first acknowledgment frame set, the first acknowledgment frame to the $X^{th}$ acknowledgment frame sent by using the different frequency bands, where N is greater than or equal to 2, X is a quantity of acknowledgment frames included in the first acknowledgment frame set, X is less than or equal to N, and operating frequency bands of the X filters are in one-to-one correspondence with and the same as the frequency bands used for sending the acknowledgment frames in the first acknowledgment frame set; and the N filters are further configured to respectively send the first acknowledgment frame to the $X^{th}$ acknowledgment frame to the baseband processing unit.

With reference to the second possible implementation manner of the fifth aspect, in a third possible implementation manner of the fifth aspect, when K is less than or equal to M and M is less than or equal to N, or when K is less than or equal to N and N is less than or equal to M, frequency band indication information of the K user equipments of the two or more user equipments respectively indicates any K different frequency bands of the M frequency bands, and timeslot indication information of the K user equipments of the two or more user equipments indicates a same timeslot.

With reference to the second possible implementation manner of the fifth aspect, in a fourth possible implementation manner of the fifth aspect, when K is greater than M and M is less than or equal to N, the K user equipments of the two or more user equipments are grouped into Q user equipment sets, where Q is K/M or Q is a rounded-up value of K/M or 1 plus a rounded-down value of K/M; and frequency band indication information of user equipments in each user equipment set of the Q user equipment sets indicates all or some of the M frequency bands from the first frequency band to the $M^{th}$ frequency band; timeslot indication information of the user equipments in each user equipment set of the Q user equipment sets indicates a same timeslot; and timeslot indication information of user equipments in any two user equipment sets of the Q user equipment sets indicates different timeslots.

With reference to the second possible implementation manner of the fifth aspect, in a fifth possible implementation manner of the fifth aspect, when K is greater than N and N is less than or equal to M, the K user equipments of the two or more user equipments are grouped into P user equipment sets, where P is K/N or P is a rounded-up value of K/N or 1 plus a rounded-down value of K/N; and frequency band indication information of user equipments in each user equipment set of the P user equipment sets indicates all or some of any N different frequency bands of the M frequency bands; timeslot indication information of the user equipments in each user equipment set indicates a same timeslot; and timeslot indication information of user equipments in any two user equipment sets of the P user equipment sets indicates different timeslots.

With reference to any one of the second possible implementation manner of the fifth aspect to the fifth possible implementation manner of the fifth aspect, in a sixth possible implementation manner of the fifth aspect, the indication information is at least $(\log_2 M + \log_2 J) \times K_{bits}$, $\log_2 M$ bits are frequency band indication information of one user equipment in the two or more user equipments, and $\log_2 J$ bits are timeslot indication information of one user equipment in the two or more user equipments; and when K is less than or equal to M and M is less than or equal to N, or when K is less than or equal to N and N is less than or equal to M, J is 2;

when K is greater than M and M is less than or equal to N, J is K/M or J is a rounded-up value of K/M or 1 plus a rounded-down value of K/M; or when K is greater than N and N is less than or equal to M, J is K/N or J is a rounded-up value of K/N or 1 plus a rounded-down value of K/N.

With reference to any one of the second possible implementation manner of the fifth aspect to the sixth possible implementation manner of the fifth aspect, in a seventh possible implementation manner of the fifth aspect, when M is less than or equal to 4 and K is less than or equal to 16, the indication information is at least 4×K bits.

With reference to any one of the first possible implementation manner of the fifth aspect to the seventh possible implementation manner of the fifth aspect, in an eighth possible implementation manner of the fifth aspect, when the baseband processing unit sends the indication information to each user equipment in the two or more user equipments by using the data frame, the indication information is included in a very high throughput signal A VHT-SIG-A in the data frame.

With reference to the fifth aspect or the first possible implementation manner of the fifth aspect to the eighth possible implementation manner of the fifth aspect, in a ninth possible implementation manner of the fifth aspect, the communications apparatus is a device that provides a WLAN access function.

According to a sixth aspect, user equipment is provided, where the user equipment includes:

a receiver, configured to receive indication information, where the indication information includes timeslot indication information and frequency band indication information of the two or more user equipments, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information;

a processor, configured to obtain timeslot indication information and frequency band indication information of the user equipment from the indication information; where the processor is further configured to obtain a data packet of the user equipment; and a transmitter, configured to send an acknowledgment frame according to the timeslot indication information and the frequency band indication information of the user equipment, in a timeslot indicated by the timeslot indication information of the user equipment, and by using a frequency band indicated by the frequency band indication information of the user equipment, where the acknowledgment frame is used to indicate that the user equipment has successfully received the data packet.

With reference to the sixth aspect, in a first possible implementation manner of the sixth aspect, the receiver is specifically configured to:

receive the indication information by using control signaling or a data frame or a beacon frame.

According to a seventh aspect, a communications system is provided, where the communications system includes:

the communications apparatus in the third aspect or the fifth aspect or any one of the foregoing possible implementation manners; and the two or more user equipments in the fourth aspect or the sixth aspect or any one of the foregoing possible implementation manners.

According to the communication method, the communications apparatus, the user equipment, and the communications system provided in the embodiments of the present invention, indication information is sent to two or more user equipments, where the indication information includes timeslot indication information and frequency band indication information of the two or more user equipments, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information; and an acknowledgment frame sent by one or more user equipments of the two or more user equipments in a timeslot indicated by respective timeslot indication information and by using a frequency band indicated by respective frequency band indication information is obtained, where the acknowledgment frame sent by the one or more user equipments of the two or more user equipments is used to indicate that the one or more user equipments have correctly received a data packet. It allows multiple user equipments to simultaneously send acknowledgment frames, thereby shortening a time for sending the acknowledgment frames by the user equipments, saving channel resources, and reducing a packet error rate. Therefore, a defect in the prior art is overcome that when a transmit end communicates with multiple receive ends, a system requires a relatively long time to return ACKs, resulting in a waste of channel resources and a large packet error rate.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Embodiment 1

Figure 1:
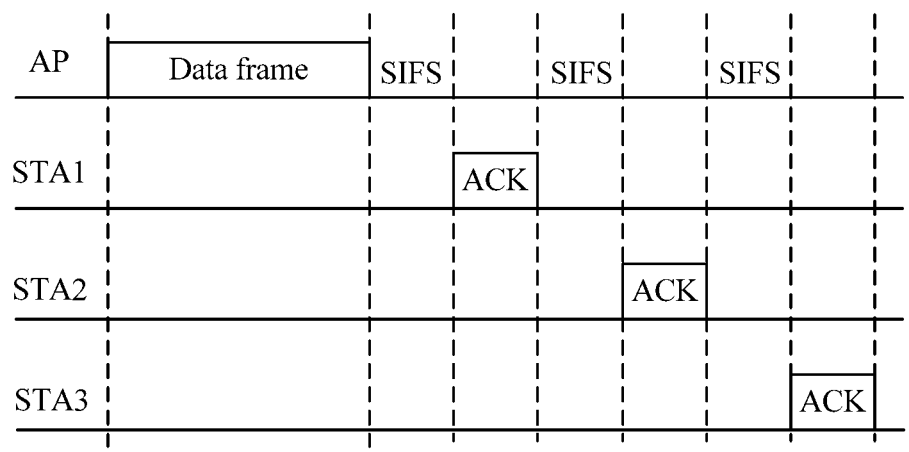
FIG. 1 is a schematic diagram of a communication scenario of a wireless local area network according to the prior art.
Figure 2:
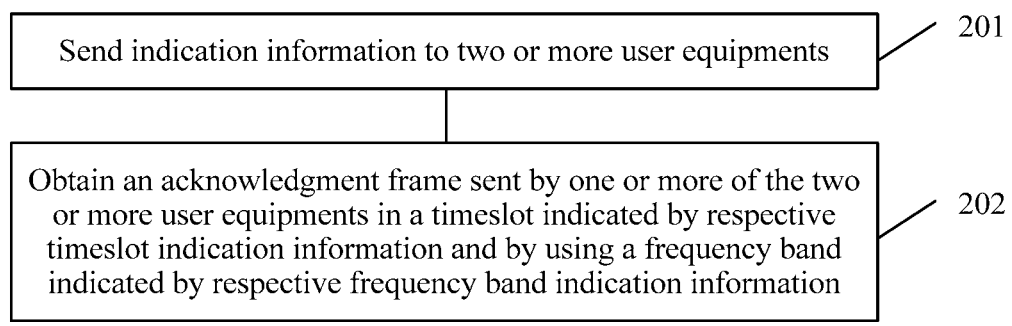
FIG. 2 is a schematic flowchart of a communication method according to an embodiment of the present invention.

Embodiment 1 of the present invention provides a communication method, and the method is applied to a communications apparatus. Referring to FIG. 2, the method may include the following steps:

201. Send indication information to two or more user equipments.

The two or more user equipments refer to user equipments that simultaneously communicate with the communications apparatus, and the indication information may include timeslot indication information and frequency band indication information of the two or more user equipments.

Further, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information.

The frequency band refers to the smallest frequency bandwidth unit used to transmit a signal and data in a communications system. For example, in a wireless local area network system, the frequency band may refer to a 20 M bandwidth.

The timeslot indication information is a relative value, and a timeslot indicated by the timeslot indication information included in the indication information refers to a timeslot after user equipment first waits timeslot indication information of the user equipment after receiving and parsing a data packet of the user equipment.

In the WLAN system, an acknowledgment frame needs to wait one SIFS timeslot before being sent. Preferably, in the WLAN system, a timeslot indicated by the timeslot indication information included in the indication information refers to a timeslot after user equipment first waits timeslot indication information of the user equipment, and then waits one SIFS timeslot interval after receiving and parsing a data packet of the user equipment.

Further, different timeslots indicated by different timeslot indication information included in the indication information may maintain a time difference with each other, so as to ensure data accuracy. The time difference may be one acknowledgment frame length.

In the WLAN system, an acknowledgment frame needs to wait one SIFS timeslot before being sent. Preferably, in the WLAN system, different timeslots indicated by different timeslot indication information included in the indication information may maintain a time difference with each other, so as to ensure data accuracy. The time difference is one SIFS timeslot interval plus one acknowledgment frame length.

It should be noted that the timeslot indication information and the frequency band indication information of the two or more user equipments may be included into the indication information according to characteristic information of the user equipments. Therefore, when receiving the indication information, the user equipment may obtain the timeslot indication information and the frequency band indication information of the user equipment from the indication information according to the characteristic information of the user equipment. The characteristic information of the user equipment may include but is not limited to a handshake sequence and a unique device ID. A sequence and a form in which the indication information includes the timeslot indication information and the frequency band indication information of the two or more user equipments are not specifically limited in the present invention.

Exemplarily, in the WLAN system, the communications apparatus sends indication information A to user equipment 1, user equipment 2, user equipment 3, and user equipment 4. A sequence in the indication information A includes: (first timeslot indication information, first frequency band indication information), (first timeslot indication information, a second frequency band indication information), (second timeslot indication information, first frequency band indication information), and (second timeslot indication information, second frequency band indication information).

It is assumed that the first timeslot indication information indicates a first timeslot, and the first timeslot is a timeslot after user equipment first waits the first timeslot indication information and then waits one SIFS timeslot interval after successfully receiving a data packet of the user equipment; the second timeslot indication information indicates a second timeslot, and the second timeslot is a timeslot after user equipment first waits the second timeslot indication information and then waits one SIFS timeslot interval after successfully receiving a data packet of the user equipment; a difference between the first timeslot indication information and the second timeslot indication information is one SIFS timeslot interval plus one acknowledgment frame length; the first frequency band indication information indicates a first 20 M frequency band; and the second frequency band indication information indicates a second 20 M frequency band.

It is further assumed that at an early stage of communication establishment, a handshake sequence of the user equipment 1 to the user equipment 4 with the communications apparatus is the user equipment 1, the user equipment 2, the user equipment 3, and the user equipment 4, and timeslot indication information and frequency band indication information of the user equipments in the indication information A are arranged according to the handshake sequence of the user equipments with the communications apparatus. In this case, the indication information A indicates that the user equipment 1 and the user equipment 2 simultaneously send acknowledgment frames to the communications apparatus by using different frequency bands, and the user equipment 3 and the user equipment 4 simultaneously send acknowledgment frames to the communications apparatus by using different frequency bands. Specifically, the indication information A indicates that the user equipment 1 sends an acknowledgment frame to the communications apparatus in the first timeslot by using the first 20 M frequency band, the user equipment 2 sends an acknowledgment frame to the communications apparatus in the first timeslot by using the second 20 M frequency band, the user equipment 3 sends an acknowledgment frame to the communications apparatus in the second timeslot by using the first 20 M frequency band, and the user equipment 4 sends an acknowledgment frame to the communications apparatus in the second timeslot by using the second 20 M frequency band. In this way, by using different frequency bands, multiple user equipments may send acknowledgment frames in a same timeslot, which reduces a total time for sending acknowledgment frames by all the user equipments.

Optionally, there may be multiple manners of sending the indication information to the two or more user equipments, and the multiple manners may specifically include but are not limited to any one of the following three manners:

Manner 1: Send the indication information to the two or more user equipments by using control signaling.

The control signaling refers to signaling that is sent by the communication apparatus to instruct a recipient to perform an operation. For example, the indication information may be sent to the two or more user equipments by using request to send (Request to Send, RTS for short) signaling or clear to send (Clear to Send, CTS for short) signaling.

When the indication information is sent to the two or more user equipments by using the control signaling, the indication information is sent separately, and data packets need to be further sent to the two or more user equipments.

It should be noted that a form of the signaling for sending the indication information is not specifically limited in the present invention, and any manner of sending the indication information by using signaling shall fall within the protection scope of the present invention.

Manner 2: Send the indication information to the two or more user equipments by using a data frame.

The data frame is sent by the communications apparatus to the user equipment and includes data packets of the two or more user equipments, and the indication information may be included in a control part of the data frame, that is, a non-data packet part of the data frame.

When the indication information is sent to the two or more user equipments by using the data frame, both the indication information and the data packets are sent by using the data frame.

Manner 3: Send the indication information to the two or more user equipments by using a beacon (beacon) frame.

Preferably, when the indication information is sent to each user equipment in the two or more user equipments by using the data frame, the indication information may be included in a very high throughput signal A (Very High Throughput signal A, VHT-SIG-A for short) in the data frame.

202. Obtain an acknowledgment frame sent by one or more user equipments of the two or more user equipments in a timeslot indicated by respective timeslot indication information and by using a frequency band indicated by respective frequency band indication information.

The acknowledgment frame sent by the one or more user equipments of the two or more user equipments is used to indicate that the one or more user equipments have correctly received a data packet. Specifically, in a process in which the communications apparatus communicates with the user equipment, the communications apparatus sends the data packet of the user equipment to the user equipment, and when correctly receiving the data packet of the user equipment, the user equipment feeds back to the communications apparatus. The feeding back is generally implemented by sending the acknowledgment frame.

Specifically, it can be learned from the description of the indication information in step 201 that, because the acknowledgment frame sent by the user equipment is sent in the timeslot indicated by the timeslot indication information and by using the frequency band indicated by the frequency band indication information, the user equipment may send acknowledgment frames in multiple different timeslots. Therefore, the obtaining an acknowledgment frame sent by one or more user equipments of the two or more user equipments in a timeslot indicated by respective timeslot indication information and by using a frequency band indicated by respective frequency band indication information may also be performed in multiple timeslots.

Because a method for obtaining an acknowledgment frame sent by one or more user equipments of the two or more user equipments in a timeslot indicated by respective timeslot indication information and by using a frequency band indicated by respective frequency band indication information keeps the same in all timeslots, only the first timeslot is used as an example in this embodiment of the present invention for a detailed description.

Specifically, the first timeslot is used as an example, and the step 202 of obtaining an acknowledgment frame sent by one or more user equipments of the two or more user equipments in a timeslot indicated by respective timeslot indication information and by using a frequency band indicated by respective frequency band indication information may include the following two steps:

202a. Receive, by using M frequency bands, a first acknowledgment frame set sent by the one or more user equipments of the two or more user equipments in a first timeslot by using different frequency bands.

The first timeslot is any one of timeslots indicated by the timeslot indication information of user equipments in the two or more user equipments.

The first acknowledgment frame set includes acknowledgment frames sent by the one or more user equipments in the first timeslot by using the different frequency bands, the two or more user equipments include K user equipments, and M and K are greater than or equal to 2.

After the one or more user equipments of the two or more user equipments send respective acknowledgment frames in the first timeslot according to the respective timeslot indication information and the respective frequency band indication information and by using the different frequency bands, and the communications apparatus receives, by using the M frequency bands, the respective acknowledgment frames sent in the first timeslot by using the different frequency bands. All these acknowledgment frames are together referred to as the first acknowledgment frame set.

It should be noted that the receiving, by using M frequency bands, a first acknowledgment frame set sent by the one or more user equipments of the two or more user equipments in a first timeslot by using different frequency bands means that operating frequency bands of the communications system that includes the communications apparatus and the two or more user equipments include the M frequency bands; when the acknowledgment frames included in the first acknowledgment frame set are sent, all the used frequency bands are included in the M frequency bands; and in the communication apparatus, a signal is generally received by using an antenna.

202b. Respectively filter the first acknowledgment frame set by using at least X filtering paths of N filtering paths, and respectively obtain, from the first acknowledgment frame set, the first acknowledgment frame to the $X^{th}$ acknowledgment frame sent by using the different frequency bands.

The filtering path is a band-pass apparatus that may pass a signal within an operating frequency band of the band-pass apparatus and effectively filter out a signal beyond the operating frequency band of the band-pass apparatus. The filtering path may be a digital filtering path, or may be an analog filtering path (for example, a filter), which is not specifically limited in the present invention.

Specifically, N is greater than or equal to 2 and is less than or equal to a quantity of antennas, and the antenna is an apparatus configured by the communications apparatus to send and receive a signal.

Further, X is a quantity of acknowledgment frames included in the first acknowledgment frame set, X is less than or equal to N, and operating frequency bands of the X filtering paths are in one-to-one correspondence with and the same as the frequency bands used for sending the acknowledgment frames in the first acknowledgment frame set.

The first acknowledgment frame set received by using the M frequency bands in step 202a is a set of acknowledgment frames sent by the one or more user equipments in the first timeslot, and the acknowledgment frames cannot be differentiated. Therefore, the first acknowledgment frame set is respectively filtered by using at least X filters of N filters in step 202b to distinguish the acknowledgment frames that are sent by using the different frequency bands and are included in the first acknowledgment frame set.

It should be noted that the X filtering paths are any X filtering paths of the N filtering paths, and selection of the X filtering paths does not affect the present invention, which is not specifically limited in the present invention.

Exemplarily, the X acknowledgment frames included in the first acknowledgment frame set are respectively recorded as the first acknowledgment frame to the $X^{th}$ acknowledgment frame, and it is assumed that the first acknowledgment frame to the $X^{th}$ acknowledgment frame are respectively sent by using a first frequency band to an $X^{th}$ frequency band, the X filters are respectively recorded as a filtering path 1, a filtering path 2, . . . , and a filtering path X, and the operating frequency bands of the X filtering paths are respectively recorded as the first frequency band, the second frequency band, . . . , and the $X^{th}$ frequency band.

Because the operating frequency bands of the X filtering paths are in one-to-one correspondence with and the same as the frequency bands used for sending the acknowledgment frames in the first acknowledgment frame set, according to a feature that the filtering path can adaptively receive data within an operating frequency band and effectively filter out data beyond the operating frequency band, the first acknowledgment frame set is respectively filtered by using the at least X filtering paths of the N filtering paths, and the first acknowledgment frame to the $X^{th}$ acknowledgment frame that are sent by using the different frequency bands are respectively obtained from the first acknowledgment frame set.

Specifically, the first acknowledgment frame set is filtered by using the filtering path 1 to obtain the first acknowledgment frame sent by using the first frequency band; the first acknowledgment frame set is filtered by using the filtering path 2 to obtain the second acknowledgment frame sent by using the second frequency band, . . . ; and the first acknowledgment frame set is filtered by using the filtering path X to obtain the $X^{th}$ acknowledgment frame sent by using the $X^{th}$ frequency band.

According to the foregoing step 202*a* and step 202*b*, the communications apparatus obtains the acknowledgment frames sent by the one or more user equipments of the two or more user equipments in the first timeslot by using the different frequency bands, and obtaining of an acknowledgment frame sent in another timeslot is the same as that in the first timeslot, and details are not described herein again.

Further, the timeslot indication information and the frequency band indication information of the two or more user equipments included in the indication information are related to a quantity K of user equipments, a quantity M of frequency bands in the communications system, and a quantity N of filtering paths. Each one of the N filtering paths configured in the communications apparatus is connected to one antenna, where N is less than a quantity of antennas.

Specifically, the timeslot indication information and the frequency band indication information of the two or more user equipments are determined by the smallest value of the quantity K of user equipments, the quantity M of frequency bands in the communications system, and the quantity N of filtering paths, and there may be the following three cases:

Case 1: When K is less than or equal to M and M is less than or equal to N, or when K is less than or equal to N and N is less than or equal to M, in Case 1, the quantity of user equipments is the smallest, both the quantity M of frequency bands in the communications system and the quantity N of filtering paths are greater than the quantity K of user equipments, and the communications system may allow all the user equipments to simultaneously send acknowledgment frames; therefore, in Case 1, frequency band indication information of the K user equipments of the two or more user equipments respectively indicates any K different frequency bands of the M frequency bands, and timeslot indication information of the K user equipments of the two or more user equipments indicates a same timeslot.

Case 2: When K is greater than M and M is less than or equal to N, in Case 2, the quantity M of frequency bands in the communications system is the smallest, and the communications apparatus can correctly receive acknowledgment frames simultaneously sent by a maximum of M user equipments; therefore, in Case 2, the K user equipments need to send acknowledgment frames in batches; in addition, because the system allows the maximum of M user equipments to simultaneously send acknowledgment frames, the K user equipments are grouped into Q user equipment sets, and all the user equipment sets simultaneously send acknowledgment frames.

Therefore, in Case 2, the K user equipments of the two or more user equipments are grouped into the Q user equipment sets, where Q is K/M or Q is a rounded-up value of K/M or 1 plus a rounded-down value of K/M.

Frequency band indication information of user equipments in each user equipment set of the Q user equipment sets indicates all or some of the M frequency bands from the first frequency band to the $M^{th}$ frequency band; timeslot indication information of the user equipments in each user equipment set of the Q user equipment sets indicates a same timeslot; and timeslot indication information of user equipments in any two user equipment sets of the Q user equipment sets indicates different timeslots.

It should be noted that in a process in which the K user equipments are grouped into the Q user equipment sets, there may be the following two scenarios:

Scenario 1: When K is an integer multiple of M, in Scenario 1, the K user equipments may be evenly allocated to the Q user equipment sets, and each user equipment set includes M user equipments. In this case, Q is K/M.

For example, if the communications apparatus simultaneously communicates with ten user equipments, and the communications apparatus can support five frequency bands, the ten user equipments are grouped into two user equipment sets, and each user equipment set includes five user equipments.

Scenario 2: When K is not an integer multiple of M, in Scenario 2, every M user equipments may be grouped into one user equipment set, and therefore first Q−1 user equipment sets each include M user equipments, and the Qth user equipment set includes the remaining fewer than M user equipments, where Q is a rounded-up value of K/M or 1 plus a rounded-down value of K/M.

For example, if the communications apparatus simultaneously communicates with ten user equipments, and the communications apparatus can support three frequency bands, the ten user equipments are grouped into four user equipment sets, where first three user equipment sets each include three user equipments, and the fourth user equipment set includes one user equipment.

Optionally, operations in the foregoing two scenarios are based on grouping the M user equipments into one user equipment set, and in an actual process of grouping the K user equipments into multiple user equipment sets, the K user equipments may be further randomly grouped into the multiple user equipment sets, where each user equipment set includes a maximum of M user equipments. This solution may also be used as an implementation manner of the present invention. For example, if the communications apparatus simultaneously communicates with ten user equipments, and the communications apparatus can support three frequency bands, the ten user equipments may be grouped into five user equipment sets. The first user equipment set includes two user equipments, the second user equipment set includes three user equipments, the third user equipment set includes two user equipments, and the fourth user equipment set includes three user equipments.

It should be noted that, that frequency band indication information of user equipments in each user equipment set of the Q user equipment sets indicates all or some of the M frequency bands from the first frequency band to the $M^{th}$ frequency band is determined according to a quantity of user equipments included in each user equipment set of the Q user equipment sets. When a user equipment set A includes M user equipments, frequency band indication information of the user equipments in the user equipment set A indicates all the M frequency bands from the first frequency band to the $M^{th}$ frequency band, or when a user equipment set A includes R user equipments, and R is less than M, frequency band indication information of the user equipments in the user equipment set A indicates some of the M frequency bands from the first frequency band to the $M^{th}$ frequency band, that is, the first frequency band to the $R^{th}$ frequency band.

Case 3: When K is greater than N and N is less than or equal to M, in Case 3, the quantity N of filtering paths is the smallest, and the communications apparatus can correctly receive acknowledgment frames simultaneously sent by a maximum of N user equipments; therefore, in Case 3, the K user equipments need to send acknowledgment frames in batches; in addition, because the system allows the maximum of N user equipments to simultaneously send acknowledgment frames, the K user equipments are grouped into P user equipment sets, and all the user equipment sets simultaneously send acknowledgment frames.

Therefore, in Case 3, the K user equipments of the two or more user equipments are grouped into the P user equipment sets, where P is K/N or P is a rounded-up value of K/N or 1 plus a rounded-down value of K/N.

Frequency band indication information of user equipments in each user equipment set of the P user equipment sets indicates all or some of any N different frequency bands of the M frequency bands; timeslot indication information of the user equipments in each user equipment set indicates a same timeslot; and timeslot indication information of user equipments in any two user equipment sets of the P user equipment sets indicates different timeslots.

It should be noted that in a process of grouping the K user equipments into the P user equipment sets, there may be the following two scenarios:

Scenario 1: When K is an integer multiple of N, in Scenario 1, the K user equipments may be evenly allocated to the P user equipment sets, and each user equipment set includes N user equipments. In this case, P is K/N.

For example, if the communications apparatus simultaneously communicates with ten user equipments, and there are five filtering paths, the ten user equipments are grouped into two user equipment sets, where each user equipment set includes five user equipments.

Scenario 2: When K is not an integer multiple of N, in Scenario 2, every N user equipments may be grouped into one user equipment set, and therefore first P−1 user equipment sets each include N user equipments, and the $P^{th}$ user equipment set includes the remaining fewer than N user equipments, where P is a rounded-up value of K/N or 1 plus a rounded-down value of K/N.

For example, if the communications apparatus simultaneously communicates with ten user equipments, and there are three filtering paths, the ten user equipments are grouped into four user equipment sets, where first three user equipment sets each include three user equipments, and the fourth user equipment set includes one user equipment.

Optionally, operations in the foregoing two scenarios are based on grouping the N user equipments into one user equipment set, and in an actual process of grouping the K user equipments into multiple user equipment sets, the K user equipments may be further randomly grouped into the multiple user equipment sets, where each user equipment set includes a maximum of M user equipments. This solution may also be used as an implementation manner of the present invention. For example, if the communications apparatus simultaneously communicates with ten user equipments, and the communications apparatus can support three frequency bands, the ten user equipments may be grouped into five user equipment sets. The first user equipment set includes two user equipments, the second user equipment set includes three user equipments, the third user equipment set includes two user equipments, and the fourth user equipment set includes three user equipments.

It should be noted that, that frequency band indication information of user equipments in each user equipment set of the P user equipment sets indicates all or some of any N of the M frequency bands is determined according to a quantity of user equipments included in each user equipment set of the P user equipment sets. When a user equipment set B includes N user equipments, frequency band indication information of the user equipments in the user equipment set B indicates all of any N of the M frequency bands, or when a user equipment set B includes S user equipments, and S is less than N, frequency band indication information of the user equipments in the user equipment set B indicates some of any N of the M frequency bands.

Further, before step 202, the method may further include: adjusting an operating frequency band of the filtering path.

How to adjust the operating frequency band of the filtering path is related to content included in the indication information. Specifically, corresponding manners of adjusting the operating frequency band of the filtering path vary according to different indication information in the foregoing three cases, and there are the following three cases:

Case 1: When K is less than or equal to M and M is less than or equal to N, or when K is less than or equal to N and N is less than or equal to M, frequency band indication information of the K user equipments of the two or more user equipments respectively indicates any K different frequency bands of the M frequency bands, and timeslot indication information of the K user equipments of the two or more user equipments indicates a same timeslot.

In this case, the adjusting an operating frequency band of the filtering path specifically includes: adjusting operating frequency bands of any K filtering paths of the N filtering paths according to the frequency bands indicated by the frequency band indication information of the K user equipments, so that the operating frequency bands of the any K filtering paths are in one-to-one correspondence with and the same as the frequency bands indicated by the frequency band indication information of the K user equipments.

Case 2: When K is greater than M and M is less than or equal to N, the K user equipments of the two or more user equipments are grouped into Q user equipment sets, where Q is K/M or Q is a rounded-up value of K/M or 1 plus a rounded-down value of K/M.

Frequency band indication information of user equipments in each user equipment set of the Q user equipment sets indicates all or some of the M frequency bands from the first frequency band to the $M^{th}$ frequency band; timeslot indication information of the user equipments in each user equipment set of the Q user equipment sets indicates a same timeslot; and timeslot indication information of user equipments in any two user equipment sets of the Q user equipment sets indicates different timeslots.

In this case, the adjusting an operating frequency band of the filtering path specifically includes: adjusting operating frequency bands of any M of the N filtering paths, so that the operating frequency bands of the any M filtering paths are the first frequency band to the $M^{th}$ frequency band respectively.

Case 3: When K is greater than N and N is less than or equal to M, the K user equipments of the two or more user equipments are grouped into P user equipment sets, where P is K/N or P is a rounded-up value of K/N or 1 plus a rounded-down value of K/N.

Frequency band indication information of user equipments in each user equipment set of the P user equipment sets indicates all or some of any N different frequency bands of the M frequency bands; timeslot indication information of the user equipments in each user equipment set indicates a same timeslot; and timeslot indication information of user equipments in any two user equipment sets of the P user equipment sets indicates different timeslots.

In this case, the adjusting an operating frequency band of the filtering path specifically includes: adjusting operating frequency bands of the N filtering paths, so that the operating frequency bands of the N filtering paths are in one-to-one correspondence with N frequency bands indicated by frequency band indication information of user equipments in a first user equipment set, where the first user equipment set is any one of the P user equipment sets.

Further, the indication information may be indicated in a binary bit form, and the indication information is at least $(\log_2 M + \log_2 J) \times K_{bits}$, where $\log_2 M$ bits are frequency band indication information of one user equipment in the two or more user equipments, and $\log_2 J$ bits are timeslot indication information of one user equipment in the two or more user equipments.

A value of J may include the following three cases:

Case 1: When K is less than or equal to M and M is less than or equal to N, or when K is less than or equal to N and N is less than or equal to M, J is 2.

In Case 1, because the indication information indicates that the K user equipments simultaneously send acknowledgment frames, there is only one timeslot, and the timeslot indication information need to be indicated only by one bit, and therefore J is 2.

Case 2: When K is greater than M and M is less than or equal to N, J is K/M or J is a rounded-up value of K/M or 1 plus a rounded-down value of K/M.

Case 3: When K is greater than N and N is less than or equal to M, J is K/N or J is a rounded-up value of K/N or 1 plus a rounded-down value of K/N.

In Case 2 or Case 3, because the indication information indicates that the K user equipments send acknowledgment frames K times, there are J timeslots, and the timeslot indication information needs to be indicated by $\log_2 J$ bits.

Because quantities of times for sending acknowledgment frames by the K user equipments are different in Case 2 and Case 3, values of J are different.

Preferably, in the wireless local area network system, according to 802.11 ac, generally, when the quantity M of frequency bands is less than or equal to 4 and K is less than or equal to 16, the indication information is at least 4×K bits to ensure compatibility after subsequent system expansion.

Exemplarily, in the wireless local area network system, according to 802.11ac, the indication information is 4×K bits. Timeslot indication information of each user equipment is two bits, and as shown in Table 1, two bits are used to indicate four different timeslots; and frequency band indication information of each user equipment is two bits, and as shown in Table 2, two bits are used to indicate four different frequency bands.

Preferably, in the WLAN system, a timeslot 1 is generally a timeslot after user equipment starts to wait one SIFS timeslot interval after receiving a data packet, and a length difference between different timeslots included in the indication information is one SIFS timeslot interval plus one acknowledgment frame length, so as to ensure data accuracy.

TABLE 1

| | |
|---|---|
| 00 | Timeslot 1 |
| 01 | Timeslot 2 |
| 10 | Timeslot 3 |
| 11 | Timeslot 4 |

TABLE 2

| | |
|---|---|
| 00 | First 20M frequency band |
| 01 | Second 20M frequency band |
| 10 | Third 20M frequency band |
| 11 | Fourth 20M frequency band |

It should be noted that a correspondence between timeslot indication information and a timeslot indicated by the timeslot indication information and a correspondence between frequency band indication information and a frequency band indicated by the frequency band indication information may be stored in a table form such as Table 1 and Table 2, or may be stored in another form, which is not specifically limited in the present invention.

It should be noted that Table 1 and Table 2 are merely exemplary descriptions of timeslot indication information and frequency band indication information, and are not limitations to forms and content of the timeslot indication information and the frequency band indication information.

It should be further noted that the correspondence between timeslot indication information and a timeslot indicated by the timeslot indication information and the correspondence between frequency band indication information and a frequency band indicated by the frequency band indication information are preset, and are clearly known to the communications apparatus and the user equipment in advance. Time and a manner of presetting the correspondence between timeslot indication information and a timeslot indicated by the timeslot indication information and the correspondence between frequency band indication information and a frequency band indicated by the frequency band indication information are not specifically limited in the present invention.

Further, the method may be applied to a MU-MIMO technology, and the communication method provided in the present invention may be used in any communications system that uses the MU-MIMO technology. Preferably, the method may be applied to the WLAN system.

According to the communication method provided in this embodiment of the present invention, indication information is sent to two or more user equipments, where at least two user equipments in the two or more user equipments have same timeslot indication information, and the user equipments that have the same timeslot indication information have different frequency band indication information; and an acknowledgment frame sent by one or more user equipments of the two or more user equipments in a timeslot indicated by respective timeslot indication information and by using a frequency band indicated by respective frequency band indication information is obtained. It allows multiple user equipments to simultaneously send acknowledgment frames, thereby shortening a time for sending the acknowledgment frames by the user equipments, saving channel resources, and reducing a packet error rate. Therefore, a defect in the prior art is overcome that when a transmit end communicates with multiple receive ends, a system requires a relatively long time to return ACKs, resulting in a waste of channel resources and a large packet error rate.

Embodiment 2

Figure 3:
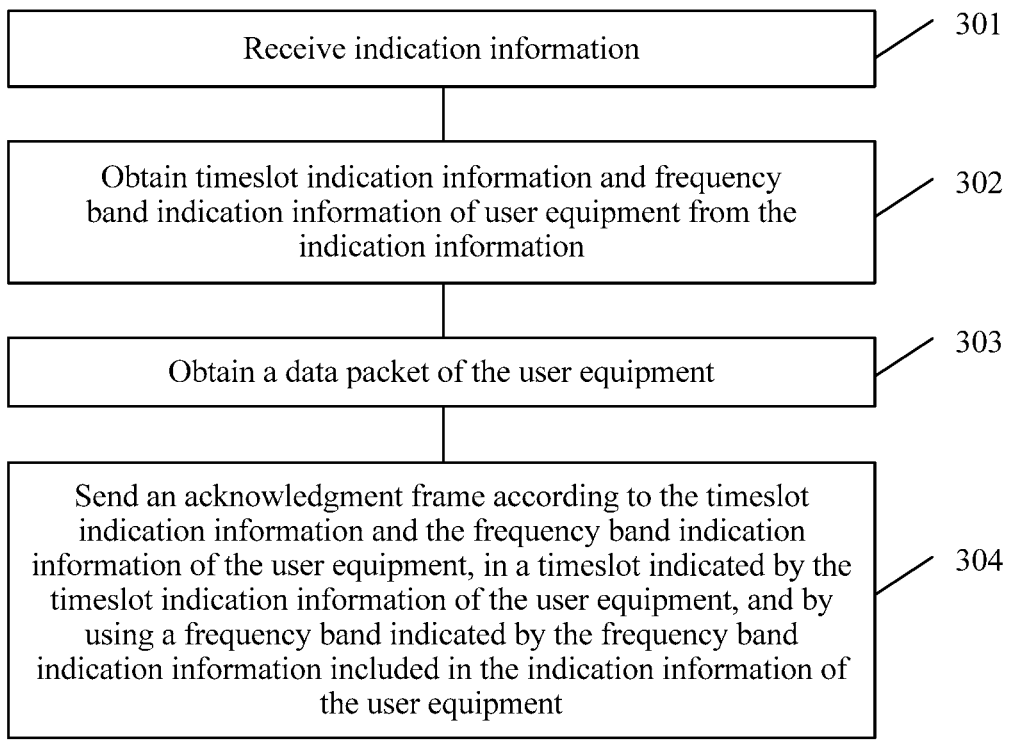
FIG. 3 is a schematic flowchart of another communication method according to an embodiment of the present invention.

Embodiment 2 of the present invention provides another communication method, and the method is applied to user equipment. Referring to FIG. 3, the method may include the following steps:

301. Receive indication information.

The indication information includes timeslot indication information and frequency band indication information of two or more user equipments, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information.

It should be noted that the indication information is described in detail in Embodiment 1, and details are not described herein again.

Optionally, the user equipment may receive the indication information by using control signaling or a data frame or a beacon frame. A manner in which the user equipment receives the indication information depends on a manner in which a communications apparatus sends the indication information, and is not specifically limited in the present invention, as long as the manners at the two ends are consistent.

302. Obtain timeslot indication information and frequency band indication information of the user equipment from the indication information.

The indication information includes the timeslot indication information and the frequency band indication information of the two or more user equipments. Each user equipment obtains respective timeslot indication information and respective frequency band indication information, and may obtain the timeslot indication information and the frequency band indication information of the user equipment from the indication information according to characteristic information of the user equipment, where the characteristic information of the user equipment may include but is not limited to a handshake sequence and a unique device ID. As long as the manners at the two ends are consistent, a sequence and a form in which the indication information includes the timeslot indication information and the frequency band indication information of the two or more user equipments are not specifically limited in the present invention.

303. Obtain a data packet of the user equipment.

The data packet of the user equipment is obtained by the user equipment from a received data frame by means of parsing.

According to different forms of sending the indication information, the user equipment obtains the data packet of the user equipment in different manners. When the indication information is sent by using the control signaling or the beacon frame, the user equipment obtains the timeslot indication information and the frequency band indication information of the user equipment from the control signaling or the beacon frame, and obtains the data packet of the user equipment from the data frame; or when the indication information is sent by using the data frame, the user equipment obtains the timeslot indication information, the frequency band indication information, and the data packet of the user equipment from the data frame.

304. Send an acknowledgment frame according to the timeslot indication information and the frequency band indication information of the user equipment, in a timeslot indicated by the timeslot indication information of the user equipment, and by using a frequency band indicated by the frequency band indication information included in the indication information of the user equipment.

According to the communication method provided in this embodiment of the present invention, indication information is received, where at least two of two or more user equipments have same timeslot indication information, and the user equipments that have the same timeslot indication information have different frequency band indication information; timeslot indication information and frequency band indication information of the user equipment are obtained from the indication information; a data packet of the user equipment is obtained; and an acknowledgment frame is sent according to the timeslot indication information and the frequency band indication information of the user equipment, in a timeslot indicated by the timeslot indication information of the user equipment, and by using a frequency band indicated by the frequency band indication information of the user equipment, where the acknowledgment frame is used to indicate that the user equipment has successfully received the data packet It allows multiple user equipments to simultaneously send acknowledgment frames, thereby shortening a time for sending the acknowledgment frames by the user equipments, saving channel resources, and reducing a packet error rate. Therefore, a defect in the prior art is overcome that when a transmit end communicates with multiple receive ends, a system requires a relatively long time to return ACKs, resulting in a waste of channel resources and a large packet error rate.

Embodiment 3

Figure 4:
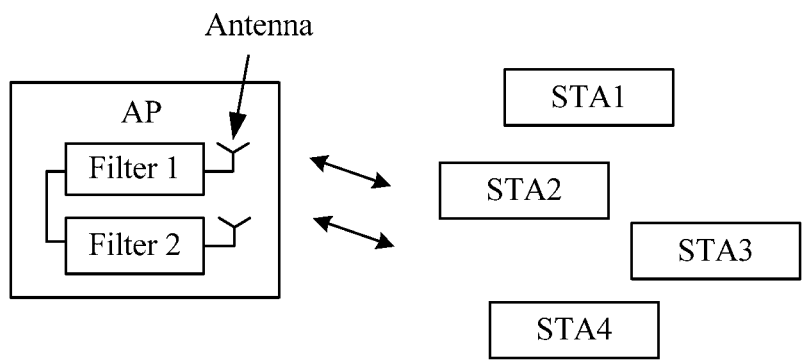
FIG. 4 is a schematic diagram of a communication scenario of a wireless local area network according to an embodiment of the present invention.

Embodiment 3 of the present invention provides another communication method. In a WLAN system, an AP serves as a communications apparatus, a STA serves as user equipment, and the AP uses a 40 M bandwidth. Referring to FIG. 4, two antennas are mounted on the AP, and the two antennas each are connected to one filter, respectively recorded as a filter 1 and a filter 2 . An example in which the AP simultaneously communicates with four STAs is used to describe in detail the communication methods shown in FIG. 2 and FIG. 3.

Figure 5A:
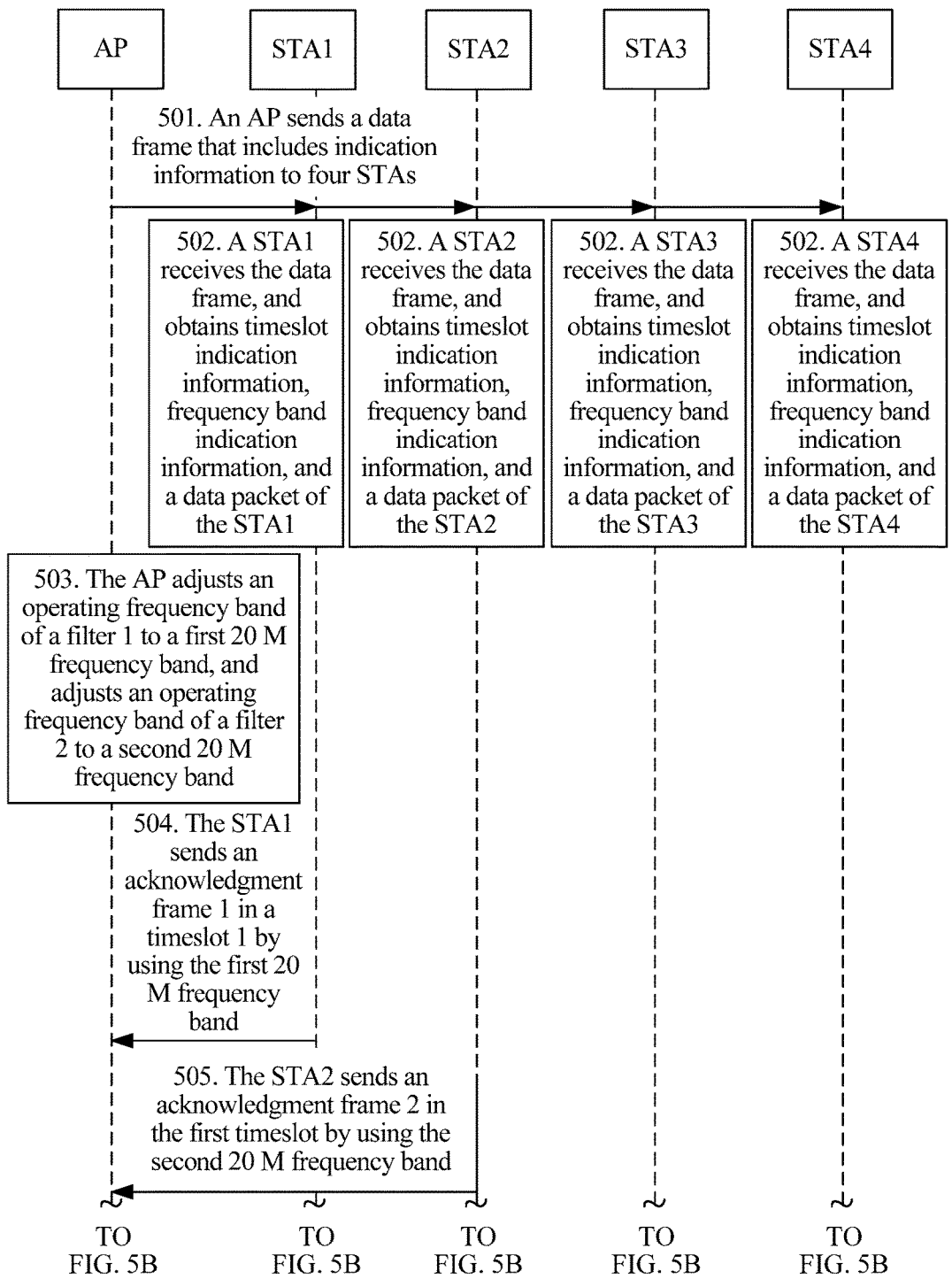
FIG. 5A and FIG. 5B are a schematic flowchart of yet another communication method according to an embodiment of the present invention.
Figure 5B:
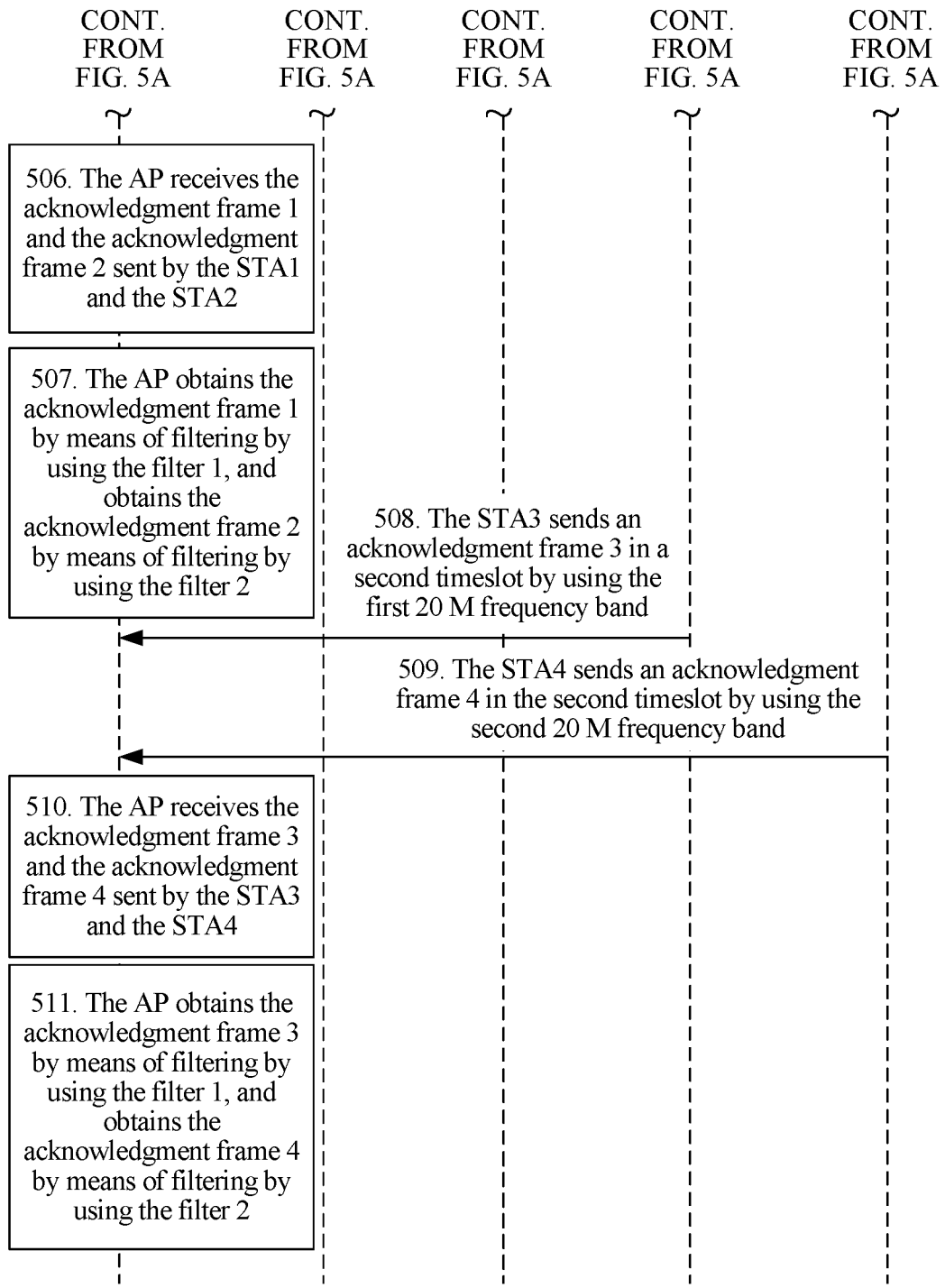

Referring to FIG. 5A and FIG. 5B, the method may include the following steps:

501. The AP sends a data frame that includes indication information to the four STAs.

The four STAs are recorded as a STA1, a STA2, a STA3, and a STA4 respectively, and it is assumed that during communication establishment, a handshake sequence of the STA1 to the STA4 with the AP is the STA1, the STA2, the STA3, and the STA4.

Exemplarily, because the AP uses the 40 M bandwidth that is, two frequency bands, and two filters to simultaneously communicate with the four STAs, that is, M=2, N=2, and K=4, there are two types of timeslot indication information of the four STAs, that is, the indication information may indicate that the four STAs send acknowledgment frames in two batches.

It is assumed that in this embodiment, a correspondence between timeslot indication information and a timeslot indicated by the timeslot indication information is shown in Table 1, and a correspondence between frequency band indication information and a frequency band indicated by the frequency band indication information is shown in Table 2.

For example, the indication information included in the data frame sent by the AP may be shown in Table 3, and timeslot indication information and frequency band indication information of the STA1 to the STA4 are indicated in Table 3 from left to right according to the handshake sequence of the STAs.

TABLE 3

| 00 00 | 00 01 | 01 00 | 01 01 |

It can be learned from Table 1 and Table 2 that the indication information shown in Table 3 indicates that the STA1 and the STA2 send acknowledgment frames in a timeslot 1 (that is, a timeslot after user equipment waits one SIFS timeslot interval after receiving a data packet of the user equipment) by using a first 20 M frequency band and a second 20 M frequency band respectively, and indicates that the STA3 and the STA4 send acknowledgment frames in a timeslot 2 (that is, a timeslot after user equipment waits one SIFS timeslot interval plus one acknowledgment frame length after successfully receiving a data packet of the user equipment) by using the first 20 M frequency band and the second 20 M frequency band respectively.

502. The STA1 to the STA4 each receive the data frame, and obtain timeslot indication information, frequency band indication information, and data packets of the STA1 to the STA4.

Specifically, the STA1 to the h respectively obtain the timeslot indication information, the frequency band indication information, and the data packets of the STA1 to the STA4 from the received data frame according to the handshake sequence with the AP.

For example, the STA1 receives the data frame, and obtains timeslot indication information 00 of the STA1, frequency band indication information 00 of the STA1, and a data packet of the STA1; the STA2 receives the data frame, and obtains timeslot indication information 00 of the STA2, frequency band indication information 01 of the STA2, and a data packet of the STA2; the STA3 receives the data frame, and obtains timeslot indication information 01 of the STA3, frequency band indication information 00 of the STA3, and a data packet of the STA3; and the STA4 receives the data frame, and obtains timeslot indication information 01 of the STA4, frequency band indication information 01 of the STA4, and a data packet of the STA4.

503. The AP adjusts an operating frequency band of the filter 1 to a first 20 M frequency band, and adjusts an operating frequency band of the filter 2 to a second 20 M frequency band.

After the AP sends the indication information to the STAs, the AP needs to adjust the operating frequency bands of the two filters to operating frequency bands included in the indication information.

504. The STA1 sends an acknowledgment frame 1 in a first timeslot by using the first 20 M frequency band.

Figure 6:
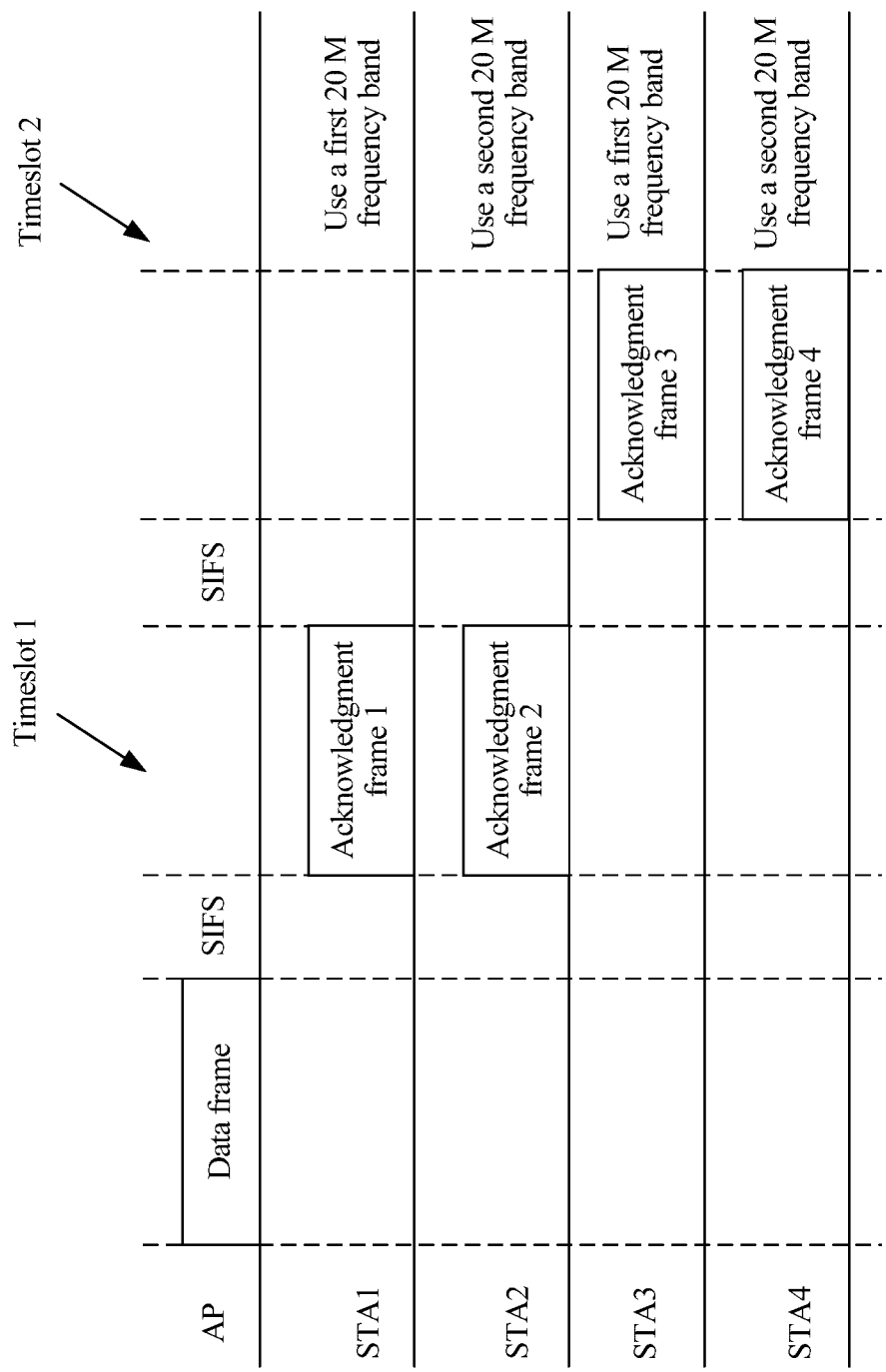
FIG. 6 is a schematic diagram of a communication scenario of a wireless local area network according to an embodiment of the present invention.

Referring to FIG. 6, FIG. 6 is a schematic scenario diagram of interaction between the AP and the STA1 to the STA4.

505. The STA2 sends an acknowledgment frame 2 in the first timeslot by using the second 20 M frequency band.

506. The AP receives the acknowledgment frame 1 and the acknowledgment frame 2 sent by the STA1 and the STA2.

When the STA sends an acknowledgment frame by using either 20 M frequency band in the 40 M bandwidth, the AP can receive the acknowledgment frame by using an antenna configured for the AP.

507. The AP obtains the acknowledgment frame 1 by means of filtering by using the frame 2, and obtains the acknowledgment frame 2 by means of filtering by using the filter 2.

508. The STA3 sends an acknowledgment frame 3 in a second timeslot by using the first 20 M frequency band.

509. The STA4 sends an acknowledgment frame 4 in the second timeslot by using the second 20 M frequency band.

510. The AP receives the acknowledgment frame 3 and the acknowledgment frame 4 sent by the STA3 and the STA4.

511. The AP obtains the acknowledgment frame 3 by means of filtering by using the frame 2, and obtains the acknowledgment frame 4 by means of filtering by using the filter 2.

In this case, the AP successfully and accurately receives the acknowledgment frames sent by the STA1 to the STA4.

It should be noted that step 501 to step 511 are merely a description of a process of the communication method, and does not limit a sequence of the steps.

According to the communication method provided in this embodiment of the present invention, an AP sends indication information to four STAs, where two user equipments have same timeslot indication information, and the user equipments that have the same timeslot indication information have different frequency band indication information; and acknowledgment frames sent by the four STAs in timeslots indicated by respective timeslot indication information and by using frequency bands indicated by respective frequency band indication information are obtained. It allows two user equipments to simultaneously send acknowledgment frames, thereby shortening a time for sending the acknowledgment frames by the user equipments, saving channel resources, and reducing a packet error rate. Therefore, a defect in the prior art is overcome that when a transmit end communicates with multiple receive ends, a system requires a relatively long time to return ACKs, resulting in a waste of channel resources and a large packet error rate.

Embodiment 4

Figure 7:
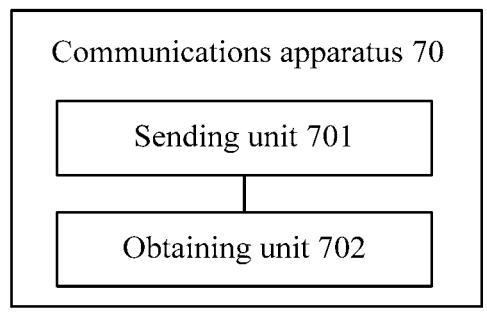
FIG. 7 is a schematic structural diagram of a communications apparatus according to an embodiment of the present invention.

Embodiment 4 of the present invention provides a communications apparatus 70. Referring to FIG. 7, the communications apparatus 70 may include:

a sending unit 701, configured to send indication information to two or more user equipments, where the indication information includes timeslot indication information and frequency band indication information of the two or more user equipments, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information; and an obtaining unit 702, configured to obtain an acknowledgment frame sent by one or more user equipments of the two or more user equipments in a timeslot indicated by respective timeslot indication information and by using a frequency band indicated by respective frequency band indication information, where the acknowledgment frame sent by the one or more user equipments of the two or more user equipments is used to indicate that the one or more user equipments have correctly received a data packet.

Optionally, the sending unit 701 may be specifically configured to:

send the indication information to the two or more user equipments by using control signaling; or send the indication information to the two or more user equipments by using a data frame; or send the indication information to the two or more user equipments by using a beacon frame.

Figure 8:
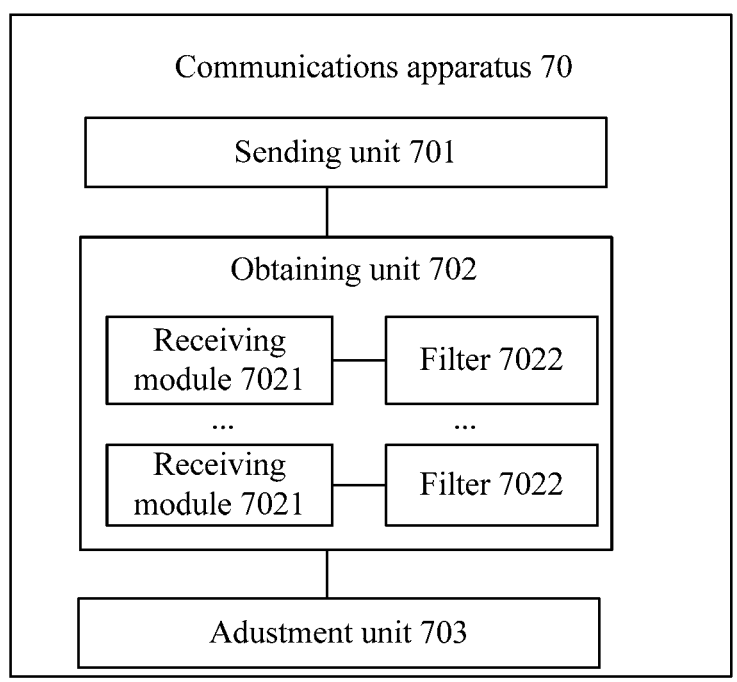
FIG. 8 is a schematic structural diagram of another communications apparatus according to an embodiment of the present invention.

Further, referring to FIG. 8, the obtaining unit 702 includes: at least two receiving modules 7021 and N filters 7022, where each filter 7022 is connected to one receiving module 7021, and N is greater than or equal to 2 and is less than or equal to a quantity of receiving modules 7021.

The at least two receiving modules 7021 are configured to receive, by using M frequency bands, a first acknowledgment frame set sent by the one or more user equipments of the two or more user equipments in a first timeslot by using different frequency bands, where the first timeslot is any one of timeslots indicated by the timeslot indication information of user equipments in the two or more user equipments, the first acknowledgment frame set includes acknowledgment frames sent by the one or more user equipments in the first timeslot by using the different frequency bands, the two or more user equipments include K user equipments, and M and K are greater than or equal to 2.

The N filters 7022 are configured to: respectively filter the first acknowledgment frame set by using at least X filters of the N filters 7022, and respectively obtain, from the first acknowledgment frame set, the first acknowledgment frame to the $X^{th}$ acknowledgment frame sent by using the different frequency bands, where N is greater than or equal to 2, X is a quantity of acknowledgment frames included in the first acknowledgment frame set, X is less than or equal to N, and operating frequency bands of the X filters are in one-to-one correspondence with and the same as the frequency bands used for sending the acknowledgment frames in the first acknowledgment frame set.

Optionally, when K is less than or equal to M and M is less than or equal to N, or when K is less than or equal to N and N is less than or equal to M, frequency band indication information of the K user equipments of the two or more user equipments respectively indicates any K different frequency bands of the M frequency bands, and timeslot indication information of the K user equipments of the two or more user equipments indicates a same timeslot.

Optionally, when K is greater than M and M is less than or equal to N, the K user equipments of the two or more user equipments are grouped into Q user equipment sets, where Q is K/M or Q is a rounded-up value of K/M or 1 plus a rounded-down value of K/M.

Frequency band indication information of user equipments in each user equipment set of the Q user equipment sets indicates all or some of the M frequency bands from the first frequency band to the $M^{th}$ frequency band; timeslot indication information of the user equipments in each user equipment set of the Q user equipment sets indicates a same timeslot; and timeslot indication information of user equipments in any two user equipment sets of the Q user equipment sets indicates different timeslots.

Optionally, when K is greater than N and N is less than or equal to M, the K user equipments of the two or more user equipments are grouped into P user equipment sets, where P is K/N or P is a rounded-up value of K/N or 1 plus a rounded-down value of K/N.

Frequency band indication information of user equipments in each user equipment set of the P user equipment sets indicates all or some of any N different frequency bands of the M frequency bands; timeslot indication information of the user equipments in each user equipment set indicates a same timeslot; and timeslot indication information of user equipments in any two user equipment sets of the P user equipment sets indicates different timeslots.

Further, referring to FIG. 8, the communications apparatus 70 may further include an adjustment unit 703, configured to adjust an operating frequency band of the filter 7022.

How to adjust the operating frequency band of the filter 7022 is related to content included in the indication information. Specifically, corresponding manners of adjusting the operating frequency band of the adjustment filter 7022 vary according to different indication information, and there are the following three cases:

Case 1: When K is less than or equal to M and M is less than or equal to N, or when K is less than or equal to N and N is less than or equal to M, frequency band indication information of the K user equipments of the two or more user equipments respectively indicates any K different frequency bands of the M frequency bands, and timeslot indication information of the K user equipments of the two or more user equipments indicates a same timeslot.

In this case, the adjusting an operating frequency band of the adjustment filter 7022 specifically includes: adjusting operating frequency bands of any K adjustment filters 7022 of the N adjustment filters 7022 according to the frequency bands indicated by the frequency band indication information of the K user equipments, so that the operating frequency bands of the any K adjustment filters 7022 are in one-to-one correspondence with and the same as the frequency bands indicated by the frequency band indication information of the K user equipments.

Case 2: When K is greater than M and M is less than or equal to N, the K user equipments of the two or more user equipments are grouped into Q user equipment sets, where Q is K/M or Q is a rounded-up value of K/M or 1 plus a rounded-down value of K/M.

Frequency band indication information of user equipments in each user equipment set of the Q user equipment sets indicates all or some of the M frequency bands from the first frequency band to the $M^{th}$ frequency band; timeslot indication information of the user equipments in each user equipment set of the Q user equipment sets indicates a same timeslot; and timeslot indication information of user equipments in any two user equipment sets of the Q user equipment sets indicates different timeslots.

In this case, the adjusting an operating frequency band of the adjustment filter 7022 specifically includes: adjusting operating frequency bands of any M adjustment filters 7022 of the N adjustment filters 7022, so that the operating frequency bands of the any M adjustment filters 7022 are the first frequency band to the $M^{th}$ frequency band respectively.

Case 3: When K is greater than N and N is less than or equal to M, the K user equipments of the two or more user equipments are grouped into P user equipment sets, where P is K/N or P is a rounded-up value of K/N or 1 plus a rounded-down value of K/N.

Frequency band indication information of user equipments in each user equipment set of the P user equipment sets indicates all or some of any N different frequency bands of the M frequency bands; timeslot indication information of the user equipments in each user equipment set indicates a same timeslot; and timeslot indication information of user equipments in any two user equipment sets of the P user equipment sets indicates different timeslots.

In this case, the adjusting an operating frequency band of the adjustment filter 7022 specifically includes: adjusting operating frequency bands of the N adjustment filters 7022, so that the operating frequency bands of the N adjustment filters 7022 are in one-to-one correspondence with N frequency bands indicated by frequency band indication information of the user equipments in a first user equipment set, where the first user equipment set is any one of the P user equipment sets.

Further, the indication information is at least $(\log_2 M + \log_2 J) \times K_{bits}$, where $\log_2 M$ bits are frequency band indication information of one user equipment in the two or more user equipments, and $\log_2 J$ bits are timeslot indication information of one user equipment in the two or more user equipments.

When K is less than or equal to M and M is less than or equal to N, or when K is less than or equal to N and N is less than or equal to M, J is 2.

When K is greater than M and M is less than or equal to N, J is K/M or J is a rounded-up value of K/M or 1 plus a rounded-down value of K/M.

When K is greater than N and N is less than or equal to M, J is K/N or J is a rounded-up value of K/N or 1 plus a rounded-down value of K/N.

Further, when M is less than or equal to 4 and K is less than or equal to 16, the indication information is at least 4×K bits.

Preferably, when the sending unit 701 sends the indication information to each user equipment in the two or more user equipments by using the data frame, the indication information is included in a very high throughput signal A VHT-SIG-A in the data frame.

Optionally, the communications apparatus 70 may be a device that provides a WLAN access function. For example, the communications apparatus 70 may be an AP or a terminal device that provides a WLAN access function.

According to the communication apparatus 70 provided in this embodiment of the present invention, indication information is sent to two or more user equipments, where at least two user equipments in the two or more user equipments have same timeslot indication information, and the user equipments that have the same timeslot indication information have different frequency band indication information; and an acknowledgment frame sent by one or more user equipments of the two or more user equipments in a timeslot indicated by respective timeslot indication information and by using a frequency band indicated by respective frequency band indication information is obtained. It allows multiple user equipments to simultaneously send acknowledgment frames, thereby shortening a time for sending the acknowledgment frames by the user equipments, saving channel resources, and reducing a packet error rate. Therefore, a defect in the prior art is overcome that when a transmit end communicates with multiple receive ends, a system requires a relatively long time to return ACKs, resulting in a waste of channel resources and a large packet error rate.

Embodiment 5

Figure 9:
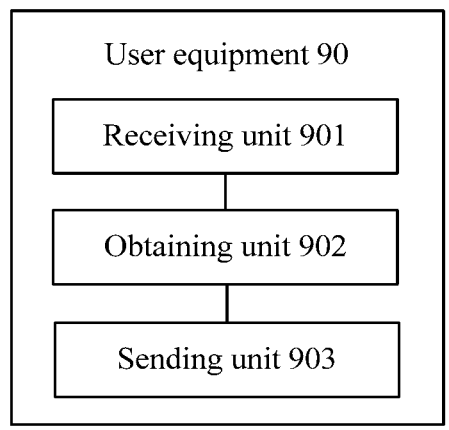
FIG. 9 is a schematic structural diagram of user equipment according to an embodiment of the present invention.

Embodiment 5 of the present invention provides user equipment 90. Referring to FIG. 9, the user equipment 90 may include:

a receiving unit 901, configured to receive indication information, where the indication information includes timeslot indication information and frequency band indication information of the two or more user equipments, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information;

an obtaining unit 902, configured to obtain timeslot indication information and frequency band indication information of the user equipment from the indication information; where the obtaining unit 902 is further configured to obtain a data packet of the user equipment; and a sending unit 903, configured to send an acknowledgment frame according to the timeslot indication information and the frequency band indication information of the user equipment, in a timeslot indicated by the timeslot indication information of the user equipment, and by using a frequency band indicated by the frequency band indication information of the user equipment, where the acknowledgment frame is used to indicate that the user equipment has successfully received the data packet.

Optionally, the receiving unit 901 may be specifically configured to receive the indication information by using control signaling or a data frame or a beacon frame.

According to the user equipment 90 provided in this embodiment of the present invention, indication information is received, where at least two of two or more user equipments have same timeslot indication information, and the user equipments that have the same timeslot indication information have different frequency band indication information; timeslot indication information and frequency band indication information of the user equipment are obtained from the indication information; a data packet of the user equipment is obtained; and an acknowledgment frame is sent according to the timeslot indication information and the frequency band indication information of the user equipment, in a timeslot indicated by the timeslot indication information of the user equipment, and by using a frequency band indicated by the frequency band indication information of the user equipment, where the acknowledgment frame is used to indicate that the user equipment has successfully received the data packet. It allows multiple user equipments to simultaneously send acknowledgment frames, thereby shortening a time for sending the acknowledgment frames by the user equipments, saving channel resources, and reducing a packet error rate. Therefore, a defect in the prior art is overcome that when a transmit end communicates with multiple receive ends, a system requires a relatively long time to return ACKs, resulting in a waste of channel resources and a large packet error rate.

Embodiment 6

Figure 10:
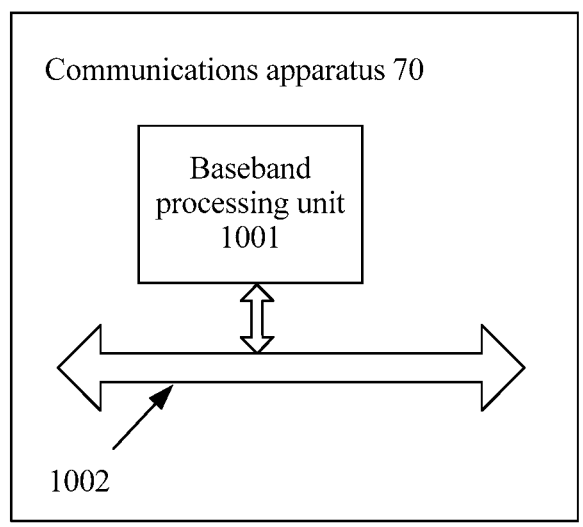
FIG. 10 is a schematic structural diagram of still another communications apparatus according to an embodiment of the present invention.

Embodiment 6 of the present invention provides a communications apparatus 70. Referring to FIG. 10, the communications apparatus 70 may include:

a baseband processing unit 1001; and at least one communications bus 1002, configured to implement connection and mutual communication between apparatuses.

The communications bus 1002 may be an industry standard architecture (Industry Standard Architecture, ISA for short) bus, a peripheral component interconnect (Peripheral Component, PCI for short) bus, an extended industry standard architecture (Extended Industry Standard Architecture, EISA for short) bus, or the like. The bus 1002 may be categorized into an address bus, a data bus, a control bus, and the like. For convenience of denotation, the bus is represented by using only one thick line in FIG. 10; however, it does not indicate that there is only one bus or only one type of bus.

The baseband processing unit 1001 may be a central processing unit (Central Processing Unit, CPU for short) or an application-specific integrated circuit (Application Specific Integrated Circuit, ASIC for short), or one or more integrated circuits configured to implement this embodiment of the present invention.

The baseband processing unit 1001 is configured to send indication information to two or more user equipments, where the indication information includes timeslot indication information and frequency band indication information of the two or more user equipments, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information.

The baseband processing unit 1001 is further configured to obtain an acknowledgment frame sent by one or more user equipments of the two or more user equipments in a timeslot indicated by respective timeslot indication information and by using a frequency band indicated by respective frequency band indication information, where the acknowledgment frame sent by the one or more user equipments of the two or more user equipments is used to indicate that the one or more user equipments have correctly received a data packet.

Optionally, the baseband processing unit 1001 may be specifically configured to:

send the indication information to the two or more user equipments by using control signaling; or send the indication information to the two or more user equipments by using a data frame; or send the indication information to the two or more user equipments by using a beacon frame.

Figure 11:
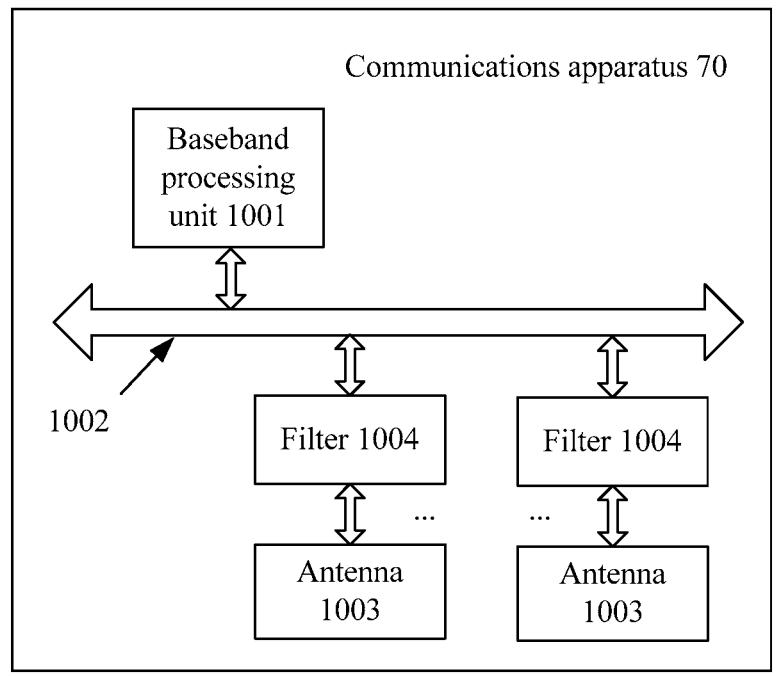
FIG. 11 is a schematic structural diagram of yet another communications apparatus according to an embodiment of the present invention.

Further, referring to FIG. 11, the communications apparatus 70 may further include at least two antennas 1003 and N filters 1004, where each filter 1004 is connected to one antenna 1004, and N is less than or equal to a quantity of antennas 1003.

The at least two antennas 1003 are configured to receive, by using M frequency bands, a first acknowledgment frame set sent by the one or more user equipments of the two or more user equipments in a first timeslot by using different frequency bands, where the first timeslot is any one of timeslots indicated by the timeslot indication information of user equipments in the two or more user equipments, the first acknowledgment frame set includes acknowledgment frames sent by the one or more user equipments in the first timeslot by using the different frequency bands, the two or more user equipments include K user equipments, and M and K are greater than or equal to 2.

The N filters 1004 are configured to: respectively filter the first acknowledgment frame set by using at least X filters of the N filters, and respectively obtain, from the first acknowledgment frame set, the first acknowledgment frame to the $X^{th}$ acknowledgment frame sent by using the different frequency bands, where N is greater than or equal to 2, X is a quantity of acknowledgment frames included in the first acknowledgment frame set, X is less than or equal to N, and operating frequency bands of the X filters are in one-to-one correspondence with and the same as the frequency bands used for sending the acknowledgment frames in the first acknowledgment frame set.

The N filters 1004 are further configured to respectively send the first acknowledgment frame to the $X^{th}$ acknowledgment frame to the baseband processing unit 1001.

Optionally, when K is less than or equal to M and M is less than or equal to N, or when K is less than or equal to N and N is less than or equal to M, frequency band indication information of the K user equipments of the two or more user equipments respectively indicates any K different frequency bands of the M frequency bands, and timeslot indication information of the K user equipments of the two or more user equipments indicates a same timeslot.

Optionally, when K is greater than M and M is less than or equal to N, the K user equipments of the two or more user equipments are grouped into Q user equipment sets, where Q is K/M or Q is a rounded-up value of K/M or 1 plus a rounded-down value of K/M.

Frequency band indication information of user equipments in each user equipment set of the Q user equipment sets indicates all or some of the M frequency bands from the first frequency band to the $M^{th}$ frequency band; timeslot indication information of the user equipments in each user equipment set of the Q user equipment sets indicates a same timeslot; and timeslot indication information of user equipments in any two user equipment sets of the Q user equipment sets indicates different timeslots.

Optionally, when K is greater than N and N is less than or equal to M, the K user equipments of the two or more user equipments are grouped into P user equipment sets, where P is K/N or P is a rounded-up value of K/N or 1 plus a rounded-down value of K/N.

Frequency band indication information of user equipments in each user equipment set of the P user equipment sets indicates all or some of any N different frequency bands of the M frequency bands; timeslot indication information of the user equipments in each user equipment set indicates a same timeslot; and timeslot indication information of user equipments in any two user equipment sets of the P user equipment sets indicates different timeslots.

Further, the baseband processing unit 1001 may be further configured to adjust an operating frequency band of the filter 1004.

How to adjust the operating frequency band of the filter 1004 is related to content included in the indication information. Specifically, corresponding manners of adjusting the operating frequency band of the adjustment filter 1004 vary according to different indication information, and there are the following three cases:

Case 1: When K is less than or equal to M and M is less than or equal to N, or when K is less than or equal to N and N is less than or equal to M, frequency band indication information of the K user equipments of the two or more user equipments respectively indicates any K different frequency bands of the M frequency bands, and timeslot indication information of the K user equipments of the two or more user equipments indicates a same timeslot.

In this case, the adjusting an operating frequency band of the adjustment filter 1004 specifically includes: adjusting operating frequency bands of any K adjustment filters 1004 of the N adjustment filters 1044 according to the frequency bands indicated by the frequency band indication information of the K user equipments, so that the operating frequency bands of the any K adjustment filters 1004 are in one-to-one correspondence with and the same as the frequency bands indicated by the frequency band indication information of the K user equipments.

Case 2: When K is greater than M and M is less than or equal to N, the K user equipments of the two or more user equipments are grouped into Q user equipment sets, where Q is K/M or Q is a rounded-up value of K/M or 1 plus a rounded-down value of K/M.

Frequency band indication information of user equipments in each user equipment set of the Q user equipment sets indicates all or some of the M frequency bands from the first frequency band to the $M^{th}$ frequency band; timeslot indication information of the user equipments in each user equipment set of the Q user equipment sets indicates a same timeslot; and timeslot indication information of user equipments in any two user equipment sets of the Q user equipment sets indicates different timeslots.

In this case, the adjusting an operating frequency band of the adjustment filter 1004 specifically includes: adjusting operating frequency bands of any M adjustment filters 1004 of the N adjustment filters 1004, so that the operating frequency bands of the any M adjustment filters 1004 are the first frequency band to the $M^{th}$ frequency band respectively.

Case 3: When K is greater than N and N is less than or equal to M, the K user equipments of the two or more user equipments are grouped into P user equipment sets, where P is K/N or P is a rounded-up value of K/N or 1 plus a rounded-down value of K/N.

Frequency band indication information of user equipments in each user equipment set of the P user equipment sets indicates all or some of any N different frequency bands of the M frequency bands; timeslot indication information of the user equipments in each user equipment set indicates a same timeslot; and timeslot indication information of user equipments in any two user equipment sets of the P user equipment sets indicates different timeslots.

In this case, the adjusting an operating frequency band of the adjustment filter 1004 specifically includes: adjusting operating frequency bands of the N adjustment filters 1004, so that the operating frequency bands of the N adjustment filters 1004 are in one-to-one correspondence with N frequency bands indicated by frequency band indication information of the user equipments in a first user equipment set, where the first user equipment set is any one of the P user equipment sets.

Further, the indication information is at least $(\log_2 M + \log_2 J) \times K_{bits}$, where $\log_2 M$ bits are frequency band indication information of one user equipment in the two or more user equipments, and $\log_2 J$ bits are timeslot indication information of one user equipment in the two or more user equipments.

When K is less than or equal to M and M is less than or equal to N, or when K is less than or equal to N and N is less than or equal to M, J is 2.

When K is greater than M and M is less than or equal to N, J is K/M or J is a rounded-up value of K/M or 1 plus a rounded-down value of K/M.

When K is greater than N and N is less than or equal to M, J is K/N or J is a rounded-up value of K/N or 1 plus a rounded-down value of K/N.

Further, when M is less than or equal to 4 and K is less than or equal to 16, the indication information is at least 4×K bits.

Preferably, when the baseband processing unit 1001 sends the indication information to each user equipment in the two or more user equipments by using the data frame, the indication information is included in a very high throughput signal A VHT-SIG-A in the data frame.

Optionally, the communications apparatus 70 may be a device that provides a WLAN access function. For example, the communications apparatus 70 may be an AP or a terminal device that provides a WLAN access function.

According to the communication apparatus 70 provided in this embodiment of the present invention, indication information is sent to two or more user equipments, where at least two user equipments in the two or more user equipments have same timeslot indication information, and the user equipments that have the same timeslot indication information have different frequency band indication information; and an acknowledgment frame sent by one or more user equipments of the two or more user equipments in a timeslot indicated by respective timeslot indication information and by using a frequency band indicated by respective frequency band indication information is obtained. It allows multiple user equipments to simultaneously send acknowledgment frames, thereby shortening a time for sending the acknowledgment frames by the user equipments, saving channel resources, and reducing a packet error rate. Therefore, a defect in the prior art is overcome that when a transmit end communicates with multiple receive ends, a system requires a relatively long time to return ACKs, resulting in a waste of channel resources and a large packet error rate.

Embodiment 7

Figure 12:
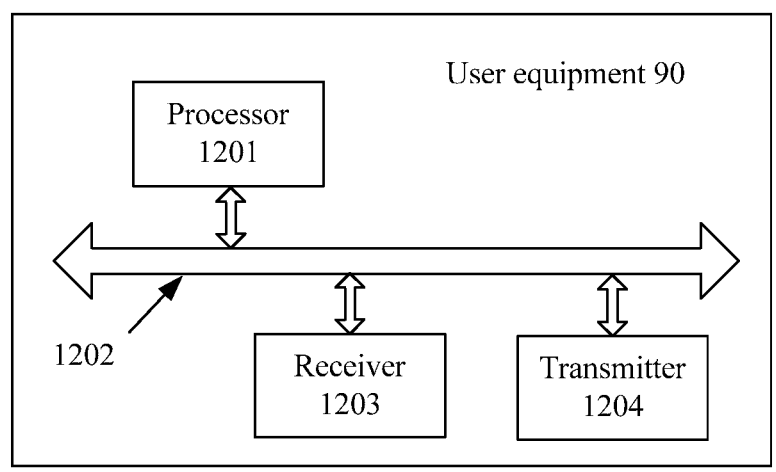
FIG. 12 is a schematic structural diagram of another user equipment according to an embodiment of the present invention.

Embodiment 7 of the present invention provides user equipment 90. Referring to FIG. 12, the user equipment 90 may include:

at least one processor 1201; at least one communications bus 1202, configured to implement connection and mutual communication between apparatuses; a receiver 1203; and a transmitter 1204.

The communications bus 1202 may be an industry standard architecture (Industry Standard Architecture, ISA for short) bus, a peripheral component interconnect (Peripheral Component, PCI for short) bus, an extended industry standard architecture (Extended Industry Standard Architecture, EISA for short) bus, or the like. The bus 1202 may be categorized into an address bus, a data bus, a control bus, and the like. For convenience of denotation, the bus is represented by using only one thick line in FIG. 12; however, it does not indicate that there is only one bus or only one type of bus.

The processor 1201 may be a central processing unit (Central Processing Unit, CPU for short) or an application-specific integrated circuit (Application Specific Integrated Circuit, ASIC for short), or one or more integrated circuits configured to implement this embodiment of the present invention.

The receiver 1203 and the transmitter 1204 may be antennas of the user equipment 90.

The receiver 1203 is configured to receive indication information, where the indication information includes timeslot indication information and frequency band indication information of the two or more user equipments, timeslot indication information of one user equipment in the two or more user equipments is used to indicate a timeslot in which the user equipment sends an acknowledgment frame, frequency band indication information of one user equipment in the two or more user equipments is used to indicate a frequency band used by the user equipment for sending an acknowledgment frame, at least two user equipments in the two or more user equipments have same timeslot indication information, and the user equipments that have the same timeslot indication information have different frequency band indication information.

The processor 1201 is configured to obtain timeslot indication information and frequency band indication information of the user equipment from the indication information.

The processor 1201 is further configured to obtain a data packet of the user equipment.

The transmitter 1204 is configured to send an acknowledgment frame according to the timeslot indication information and the frequency band indication information of the user equipment, in a timeslot indicated by the timeslot indication information of the user equipment, and by using a frequency band indicated by the frequency band indication information of the user equipment, where the acknowledgment frame is used to indicate that the user equipment has successfully received the data packet.

Optionally, the receiver 1203 may be specifically configured to:

receive the indication information by using control signaling or a data frame or a beacon frame.

According to the user equipment 90 provided in this embodiment of the present invention, indication information is received, where at least two of two or more user equipments have same timeslot indication information, and the user equipments that have the same timeslot indication information have different frequency band indication information; timeslot indication information and frequency band indication information of the user equipment are obtained from the indication information; a data packet of the user equipment is obtained; and an acknowledgment frame is sent according to the timeslot indication information and the frequency band indication information of the user equipment, in a timeslot indicated by the timeslot indication information of the user equipment, and by using a frequency band indicated by the frequency band indication information of the user equipment, where the acknowledgment frame is used to indicate that the user equipment has successfully received the data packet. It allows multiple user equipments to simultaneously send acknowledgment frames, thereby shortening a time for sending the acknowledgment frames by the user equipments, saving channel resources, and reducing a packet error rate. Therefore, a defect in the prior art is overcome that when a transmit end communicates with multiple receive ends, a system requires a relatively long time to return ACKs, resulting in a waste of channel resources and a large packet error rate.

Embodiment 8

Figure 13:
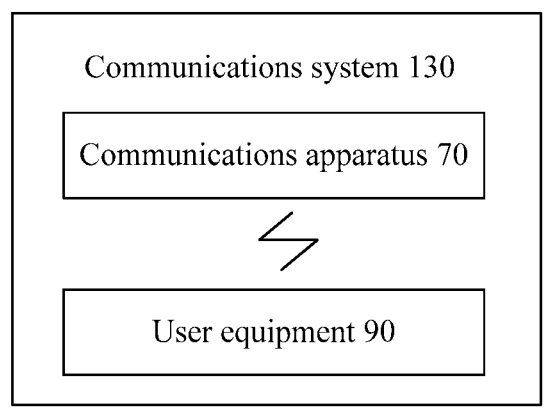
FIG. 13 is a schematic structural diagram of a communications system according to an embodiment of the present invention.

Embodiment 8 of the present invention provides a communications system 130. Referring to FIG. 13, the communications system 130 may include:

the communications apparatus 70 in any one of the foregoing embodiments; and the two or more user equipments 90 in any one of the foregoing embodiments.

According to the communication system 130 provided in this embodiment of the present invention, indication information is sent to two or more user equipments, where at least two user equipments in the two or more user equipments have same timeslot indication information, and the user equipments that have the same timeslot indication information have different frequency band indication information; and an acknowledgment frame sent by one or more user equipments of the two or more user equipments in a timeslot indicated by respective timeslot indication information and by using a frequency band indicated by respective frequency band indication information is obtained. It allows multiple user equipments to simultaneously send acknowledgment frames, thereby shortening a time for sending the acknowledgment frames by the user equipments, saving channel resources, and reducing a packet error rate. Therefore, a defect in the prior art is overcome that when a transmit end communicates with multiple receive ends, a system requires a relatively long time to return ACKs, resulting in a waste of channel resources and a large packet error rate.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A communication method, wherein the method comprises:
    sending indication information to two or more user equipments, wherein the indication information comprises timeslot indication information and frequency band indication information of the two or more user equipments, the timeslot indication information indicates one or more timeslots in which the two or more user equipments send a respective acknowledgment frame, the frequency band indication information indicates one or more frequency bands used by the two or more user equipments for sending the respective acknowledgment frame, at least two user equipments in the two or more user equipments have same timeslot indication information, and the user equipments that have the same timeslot indication information have different frequency band indication information; and
    obtaining an acknowledgment frame sent by one or more user equipments of the two or more user equipments in a timeslot indicated by respective timeslot indication information and by using a frequency band indicated by respective frequency band indication information,
    wherein the acknowledgment frame sent by the one or more user equipments of the two or more user equipments is used to indicate that the one or more user equipments have correctly received a data packet;
    wherein the obtaining an acknowledgment frame sent by one or more user equipments of the two or more user equipments in a timeslot indicated by respective timeslot indication information and by using a frequency band indicated by respective frequency band indication information comprises:
    receiving, by using M frequency bands, a first acknowledgment frame set sent by the one or more user equipments of the two or more user equipments in a first timeslot by using different frequency bands, wherein the first timeslot is one of timeslots indicated by the timeslot indication information, the first acknowledgment frame set comprises acknowledgment frames sent by the one or more user equipments in the first timeslot by using the different frequency bands, the two or more user equipments comprise K user equipments, and M and K are greater than or equal to 2;
    respectively filtering the first acknowledgment frame set by using at least X filtering paths of N filtering paths; and
    respectively obtaining, from the first acknowledgment frame set, a first acknowledgment frame to an $X^{th}$ acknowledgment frame sent by using the different frequency bands, wherein N is greater than or equal to 2 and is less than or equal to a quantity of antennas, X is a quantity of acknowledgment frames comprised in the first acknowledgment frame set, X is less than or equal to N, and operating frequency bands of the X filtering paths are in one-to-one correspondence with and the same as the frequency bands used for sending acknowledgment frames in the first acknowledgment frame set.

2. The method according to claim 1, wherein
when K is less than or equal to M and M is less than or equal to N, or when K is less than or equal to N and N is less than or equal to M, frequency band indication information of the K user equipments of the two or more user equipments respectively indicates K different frequency bands of the M frequency bands, and timeslot indication information of the K user equipments of the two or more user equipments indicates a same timeslot.

3. The method according to claim 1, wherein
when K is greater than M and M is less than or equal to N,
    the K user equipments of the two or more user equipments are grouped into Q user equipment sets, wherein Q is at least one of K/M, a rounded-up value of K/M, or 1 plus a rounded-down value of K/M;
    frequency band indication information of user equipments in each user equipment set of the Q user equipment sets indicates all or some of the M frequency bands from a first frequency band to an $M^{th}$ frequency band;
    timeslot indication information of the user equipments in each user equipment set of the Q user equipment sets indicates a same timeslot; and
    timeslot indication information of user equipments in any two user equipment sets of the Q user equipment sets indicates different timeslots.

4. The method according to claim 1, wherein
when K is greater than N and N is less than or equal to M,
the K user equipments of the two or more user equipments are grouped into P user equipment sets, wherein P is at least one of K/N, a rounded-up value of K/N, or 1 plus a rounded-down value of K/N;
frequency band indication information of user equipments in each user equipment set of the P user equipment sets indicates all or some of any N different frequency bands of the M frequency bands;
timeslot indication information of the user equipments in each user equipment set indicates a same timeslot; and
timeslot indication information of user equipments in any two user equipment sets of the P user equipment sets indicates different timeslots.

5. The method according to claim 1, wherein the indication information comprises at least $(\log_2 M + \log_2 J) \times K$ bits, wherein $\log_2 M$ bits are used to indicate frequency band indication information of one user equipment in the two or more user equipments, and $\log_2 J$ bits are used to indicate timeslot indication information of one user equipment in the two or more user equipments; and
when K is less than or equal to M and M is less than or equal to N, or when K is less than or equal to N and N is less than or equal to M, J is 2;
when K is greater than M and M is less than or equal to N, J is at least one of K/M, a rounded-up value of K/M, or 1 plus a rounded-down value of K/M; or
when K is greater than N and N is less than or equal to M, J is at least one of K/N, a rounded-up value of K/N, or 1 plus a rounded-down value of K/N.

6. The method according to claim 1, wherein when M is less than or equal to 4 and K is less than or equal to 16, the indication information is at least 4×K bits.

7. The method according to claim 1, wherein when the indication information is sent to each user equipment in the two or more user equipments by using a data frame, the indication information is comprised in a very high throughput signal (A VHT-SIG-A) in the data frame.

8. The method according to claim 1, wherein the method is performed in a wireless local area network (WLAN) system.

9. A communications apparatus, wherein the communications apparatus comprises:
a baseband processor configured to send indication information to two or more user equipments, wherein the indication information comprises timeslot indication information and frequency band indication information of the two or more user equipments, the timeslot indication information indicates one or more timeslots in which the two or more user equipments send a respective acknowledgment frame, the frequency band indication information indicates one or more frequency bands used by the two or more user equipments for sending the respective acknowledgment frame, at least two user equipments in the two or more user equipments have same timeslot indication information, and the user equipments that have the same timeslot indication information have different frequency band indication information; wherein
the baseband processor is further configured to obtain an acknowledgment frame sent by one or more user equipments of the two or more user equipments in a timeslot indicated by respective timeslot indication information and by using a frequency band indicated by respective frequency band indication information, wherein the acknowledgment frame sent by the one or more user equipments of the two or more user equipments is used to indicate that the one or more user equipments have correctly received a data packet;
wherein the communications apparatus further comprises:
at least two antennas and N filters, wherein each filter is connected to one antenna, and N is greater than or equal to 2 and is less than or equal to a quantity of antennas, wherein
the at least two antennas are configured to:
receive, by using M frequency bands, a first acknowledgment frame set sent by the one or more user equipments of the two or more user equipments in a first timeslot by using different frequency bands, wherein the first timeslot is one of timeslots indicated by the timeslot indication information, the first acknowledgment frame set comprises acknowledgment frames sent by the one or more user equipments in the first timeslot by using the different frequency bands, the two or more user equipments comprise K user equipments, and M and K are greater than or equal to 2; and
the N filters are configured to:
respectively filter the first acknowledgment frame set by using at least X filters of the N filters:
respectively obtain, from the first acknowledgment frame set, a first acknowledgment frame to an $X^{th}$ acknowledgment frame sent by using the different frequency bands, wherein N is greater than or equal to 2, X is a quantity of acknowledgment frames comprised in the first acknowledgment frame set, X is less than or equal to N, and operating frequency bands of the X filters are in one-to-one correspondence with and the same as the frequency bands used for sending acknowledgment frames in the first acknowledgment frame set and
respectively send the first acknowledgment frame to the $X^{th}$ acknowledgment frame to the baseband processor.

10. The apparatus according to claim 9, wherein
when K is less than or equal to M and M is less than or equal to N, or when K is less than or equal to N and N is less than or equal to M, frequency band indication information of the K user equipments of the two or more user equipments respectively indicates K different frequency bands of the M frequency bands, and timeslot indication information of the K user equipments of the two or more user equipments indicates a same timeslot.

11. The apparatus according to claim 9, wherein
when K is greater than M and M is less than or equal to N,
the K user equipments of the two or more user equipments are grouped into Q user equipment sets, wherein Q is at least one of K/M, a rounded-up value of K/M, or 1 plus a rounded-down value of K/M; and
frequency band indication information of user equipments in each user equipment set of the Q user equipment sets indicates all or some of the M frequency bands from a first frequency band to an $M^{th}$ frequency band;
timeslot indication information of the user equipments in each user equipment set of the Q user equipment sets indicates a same timeslot; and
timeslot indication information of user equipments in any two user equipment sets of the Q user equipment sets indicates different timeslots.

12. The apparatus according to claim 9, wherein
when K is greater than N and N is less than or equal to M,
the K user equipments of the two or more user equipments are grouped into P user equipment sets, wherein P is at least one of K/N, a rounded-up value of K/N, or 1 plus a rounded-down value of K/N;
frequency band indication information of user equipments in each user equipment set of the P user equipment sets indicates all or some of any N different frequency bands of the M frequency bands;
timeslot indication information of the user equipments in each user equipment set indicates a same timeslot; and
timeslot indication information of user equipments in any two user equipment sets of the P user equipment sets indicates different timeslots.

13. The apparatus according to claim 9, wherein the indication information comprises at least $(\log_2 M + \log_2 J) \times K$ bits, $\log_2 M$ bits are used to indicate frequency band indication information of one user equipment in the two or more user equipments, and $\log_2 J$ bits are used to indicate timeslot indication information of one user equipment in the two or more user equipments; and
when K is less than or equal to M and M is less than or equal to N, or when K is less than or equal to N and N is less than or equal to M, J is 2;
when K is greater than M and M is less than or equal to N, J is at least one of K/M, a rounded-up value of K/M, or 1 plus a rounded-down value of K/M; or
when K is greater than N and N is less than or equal to M, J is at least one of K/N, a rounded-up value of K/N, or 1 plus a rounded-down value of K/N.

14. The apparatus according to claim 9, wherein when M is less than or equal to 4 and K is less than or equal to 16, the indication information is at least $4 \times K$ bits.

15. The apparatus according to claim 9, wherein when the baseband processor is configured to send the indication information to each user equipment in the two or more user equipments by using a data frame, and the indication information is comprised in a very high throughput signal A VHT-SIG-A in the data frame.

16. The apparatus according to claim 9, wherein the communications apparatus provides a WLAN access function.

* * * * *

UNITED STATES PATENT AND TRADEMARK OFFICE
CERTIFICATE OF CORRECTION

PATENT NO. : 10,349,390 B2
APPLICATION NO. : 15/394301
DATED : July 9, 2019
INVENTOR(S) : Weishan Lu and Tao Wu It is certified that error appears in the above-identified patent and that said Letters Patent is hereby corrected as shown below:

In the Claims

In Column 40, Line 26, in Claim 9, delete "filters:" and insert -- filters; --, therefor.

In Column 40, Line 37, in Claim 9, delete "set" and insert -- set; --, therefor.

Signed and Sealed this
Seventh Day of January, 2020

Andrei Iancu
*Director of the United States Patent and Trademark Office*